United States Patent
Zhang et al.

(10) Patent No.: US 11,637,600 B1
(45) Date of Patent: Apr. 25, 2023

(54) PHASE PRECOMPENSATION FOR MULTIPLE USER-MULTIPLE INPUT MULTIPLE OUTPUT ANTENNA MIS-ALIGNMENT

(71) Applicant: QUALCOMM Incorporated, San Diego, CA (US)

(72) Inventors: Danlu Zhang, San Diego, CA (US); Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/688,624

(22) Filed: Mar. 7, 2022

(51) Int. Cl.
*H04B 7/0456* (2017.01)
*H01Q 3/30* (2006.01)
*H04B 17/10* (2015.01)
*H04B 7/0452* (2017.01)

(52) U.S. Cl.
CPC ............ *H04B 7/0469* (2013.01); *H01Q 3/30* (2013.01); *H04B 7/0452* (2013.01); *H04B 17/104* (2015.01)

(58) Field of Classification Search
CPC .. H04B 7/0469; H04B 7/0452; H04B 17/104; H01Q 3/30
See application file for complete search history.

(56) References Cited

U.S. PATENT DOCUMENTS

| 6,188,913 B1* | 2/2001 | Fukagawa | H01Q 21/29 |
| | | | 342/359 |
| 2017/0117946 A1* | 4/2017 | Lee | G01S 3/72 |

\* cited by examiner

*Primary Examiner* — Vineeta S Panwalkar
(74) *Attorney, Agent, or Firm* — Holland & Hart LLP

(57) ABSTRACT

Methods, systems, and devices for wireless communications are described. A wireless device may apply phase precompensation to multiple user-multiple input multiple output (MU-MIMO) communications with different wireless devices. The wireless device may measure one or more axis offsets between antenna arrays of the wireless device and other antenna arrays of different wireless devices. The wireless device may perform MU-MIMO communications with the different wireless devices by applying phase precompensation according to the axis offset. For example, the wireless device may transmit or receive communications from multiple wireless devices using the phase precompensation.

30 Claims, 12 Drawing Sheets

PHASE PRECOMPENSATION FOR MULTIPLE USER-MULTIPLE INPUT MULTIPLE OUTPUT ANTENNA MIS-ALIGNMENT

FIELD OF TECHNOLOGY

The following relates to wireless communications, including phase precompensation for multiple user-multiple input multiple output (MU-MIMO) antenna mis-alignment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support phase precompensation for multiple user-multiple input multiple output (MU-MIMO) antenna mis-alignment. For example, the described techniques provide for a wireless device to apply different phase precompensation to MU-MIMO communications with different wireless devices. In some cases, the wireless device may measure one or more axis offsets between antenna arrays of the wireless device and other antenna arrays of different wireless devices (e.g., based on one or more phase measurements, rotational angle measurements, distances between the wireless devices, interference measurements, or any combination thereof). The wireless device may perform MU-MIMO communications with the different wireless devices by applying phase precompensation according to the axis offset. For example, the wireless device may transmit or receive communications from multiple wireless devices using the phase precompensation.

A method is described. The method may include measuring a first axis offset between a first antenna array of the first wireless device and a second antenna array of a second wireless device, measuring a second axis offset between the first antenna array of the first wireless device and a third antenna array of a third wireless device, and performing MU-MIMO communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

An apparatus is described. The apparatus may include a processor, memory coupled with the processor, and instructions stored in the memory. The instructions may be executable by the processor to cause the apparatus to measure a first axis offset between a first antenna array of the first wireless device and a second antenna array of a second wireless device, measure a second axis offset between the first antenna array of the first wireless device and a third antenna array of a third wireless device, and perform MU-MIMO communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

Another apparatus is described. The apparatus may include means for measuring a first axis offset between a first antenna array of the first wireless device and a second antenna array of a second wireless device, means for measuring a second axis offset between the first antenna array of the first wireless device and a third antenna array of a third wireless device, and means for performing MU-MIMO communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

A non-transitory computer-readable medium storing code is described. The code may include instructions executable by a processor to measure a first axis offset between a first antenna array of the first wireless device and a second antenna array of a second wireless device, measure a second axis offset between the first antenna array of the first wireless device and a third antenna array of a third wireless device, and perform MU-MIMO communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

Some examples of the method, apparatuses, and non-transitory computer-readable medium described herein may further include operations, features, means, or instructions for determining the first phase precompensation based on a first rotational angle and the first axis offset, where the first rotational angle may be between the first antenna array and the second antenna array and determining the second phase precompensation based on a second rotational angle and the second axis offset, where the second rotational angle may be between the first antenna array and the third antenna array.

Some examples of the method, apparatuses, and non-transitory computer-readable medium described herein may further include operations, features, means, or instructions for estimating the first rotational angle based on one or more first phase measurements and estimating the second rotational angle based on one or more second phase measurements.

Some examples of the method, apparatuses, and non-transitory computer-readable medium described herein may further include operations, features, means, or instructions for estimating the first rotational angle according to a first coordinate plane between the first antenna array and the second antenna array and estimating the second rotational angle according to a second coordinate plane between the first antenna array and the third antenna array.

In some examples of the method, apparatuses, and non-transitory computer-readable medium described herein, performing the MU-MIMO communications may include operations, features, means, or instructions for transmitting, to the second wireless device, the communications associated with the second wireless device based on applying the first phase precompensation and transmitting, to the third wireless device, the communications associated with the third wireless device based on applying the second phase precompensation, where the first antenna array includes a transmit antenna array and the second antenna array and the third antenna array include receive antenna arrays.

In some examples of the method, apparatuses, and non-transitory computer-readable medium described herein, performing the MU-MIMO communications may include operations, features, means, or instructions for receiving, from the second wireless device, the communications associated with the second wireless device based on applying the first phase precompensation and receiving, from the third wireless device, the communications associated with the third wireless device based on applying the second phase precompensation, where the first antenna array includes a receive antenna array and the second antenna array and the third antenna array include transmit antenna arrays.

Some examples of the method, apparatuses, and non-transitory computer-readable medium described herein may further include operations, features, means, or instructions for performing one or more first phase measurements on a first reference signal from the second wireless device via the second antenna array, where the first axis offset may be obtained from a coordinate rotation of the one or more first phase measurements and performing one or more second phase measurements on a second reference signal from the third wireless device via the third antenna array, where the second axis offset may be obtained from a coordinate rotation of the one or more second phase measurements.

Some examples of the method, apparatuses, and non-transitory computer-readable medium described herein may further include operations, features, means, or instructions for measuring the first axis offset may be based on determining the first antenna array and the second antenna array may be symmetric and measuring the second axis offset may be based on determining the first antenna array and the third antenna array may be symmetric.

Some examples of the method, apparatuses, and non-transitory computer-readable medium described herein may further include operations, features, means, or instructions for measuring the first axis offset may be based on comparing one or more first distances between the first wireless device and the second wireless device according to one or more first phase measurements and measuring the second axis offset may be based on comparing one or more second distances between the first wireless device and the third wireless device according to one or more second phase measurements.

Some examples of the method, apparatuses, and non-transitory computer-readable medium described herein may further include operations, features, means, or instructions for comparing the one or more first distances during a first threshold time associated with the one or more first phase measurements and comparing the one or more second distances during a second threshold time associated with the one or more second phase measurements.

Some examples of the method, apparatuses, and non-transitory computer-readable medium described herein may further include operations, features, means, or instructions for comparing the one or more first distances and the one or more second distances during a same duration based on a threshold distance between the second wireless device and the third wireless device being satisfied.

DETAILED DESCRIPTION

In some wireless communications systems, one or more receiving devices and one or more transmitting devices may modulate signals according to a waveform. For example, the devices may communicate according to an orbital angular momentum (OAM) waveform in which the devices use a circular antenna or the devices use multiple antennas arranged on concentric circles. One or more wireless devices may use phase precompensation to align receive antennas with transmit antennas for effective communications. A wireless device may implement multiple-input multiple-output (MIMO) technology that uses multiple transmitters and receivers to transfer data throughout a duration. A wireless communication system may implement multi-user-MIMO (MU-MIMO) communications where there may be multiple users implementing MIMO in the wireless communications system. Specifically, MU-MIMO may enable concurrent or simultaneous one-to-many transmissions. For MU-MIMO, a transmitting device or receiving device may not know how to apply the phase precompensation for communication with multiple wireless devices for antenna alignment.

As described herein, a transmitting device or a receiving device may measure multiple axis offsets for MU-MIMO communications. For example, a transmitting device may measure multiple axis offsets for communications with multiple receiving devices, while a receiving device may measure multiple axis offsets for communications with multiple transmitting devices. The axis offset may be a distance between antenna arrays of the devices. The transmitting device or receiving device may also measure a rotational angle between the antenna arrays of the devices. The transmitting device or receiving device may use the multiple axis offsets, rotational angles, or both to perform MU-MIMO communications with multiple wireless devices by applying phase precompensation according to an axis offset and rotational angle for a transmitter and receiver pair. For a transmitting device, the communications may be to multiple receiving devices. For a receiving device, the communications may be to multiple transmitting devices.

Aspects of the disclosure are initially described in the context of wireless communications systems. Aspects of the disclosure are further described in the context of antenna array configurations. Aspects of the disclosure are further illustrated by and described with reference to apparatus diagrams, system diagrams, and flowcharts that relate to phase precompensation for MU-MIMO antenna mis-alignment.

Figure 1:
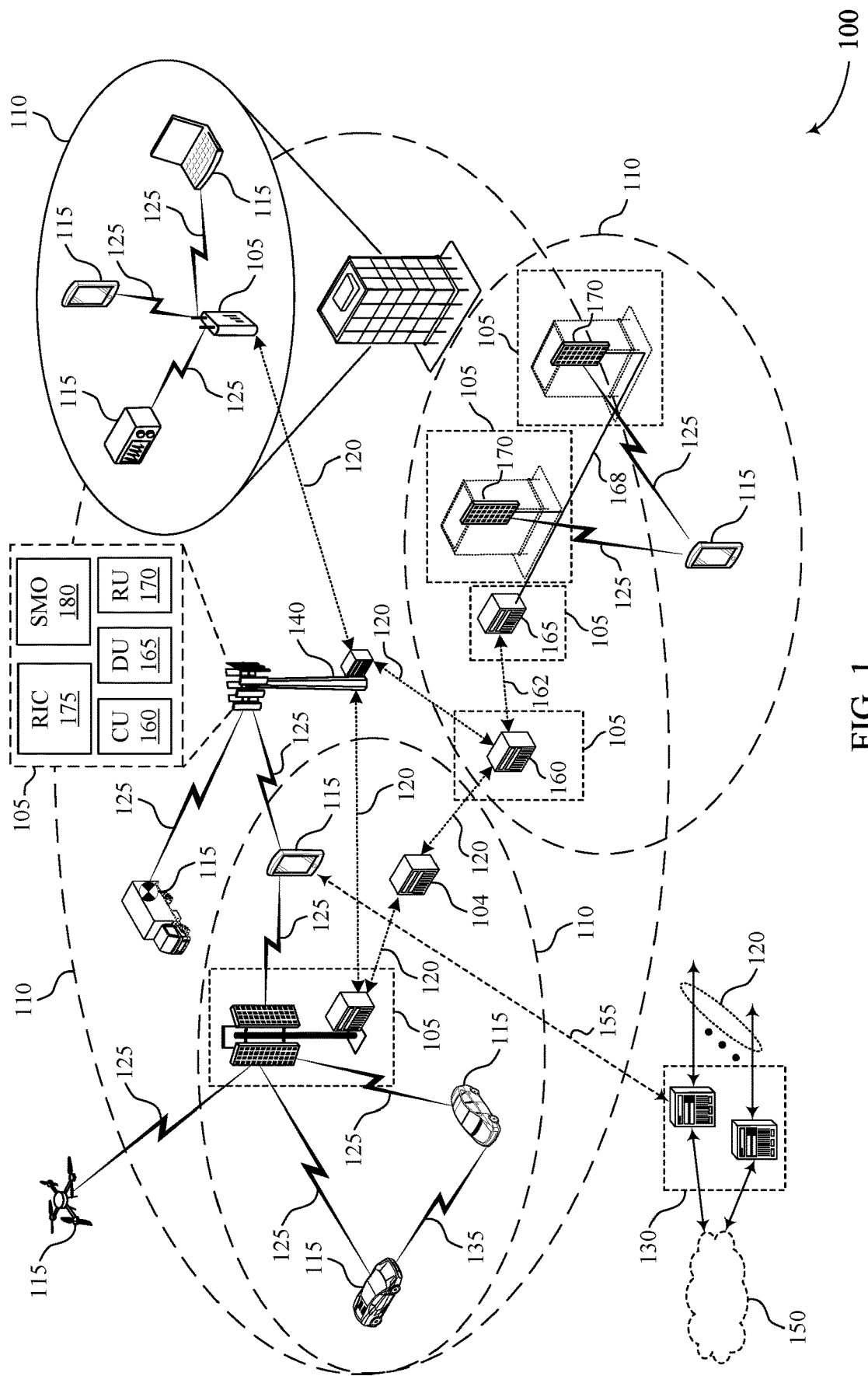
FIG. 1 illustrates an example of a wireless communications system that supports phase precompensation for multiple user-multiple input multiple output (MU-MIMO) antenna mis-alignment in accordance with one or more aspects of the present disclosure.

FIG. 1 illustrates an example of a wireless communications system 100 that supports phase precompensation for MU-MIMO antenna mis-alignment in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support phase precompensation for MU-MIMO antenna mis-alignment as described herein. For example, some operations described as being performed by a UE 115 or a network entity 105 (e.g., a base station 140) may additionally or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, a wireless communications system may implement OAM and other line of sight (LoS) MIMO techniques. For example, an antenna array may generate an OAM waveform. MU-MIMO may enable simultaneous one-to-may transmissions, which may improve communication techniques for OAM, LoS-MIMO, or both. For example, in MU-MIMO communications, a single network device may communicate with multiple other wireless devices simultaneously. In some cases, one or more wireless devices may align a receive plane to a transmit plane for LoS MIMO schemes including OAM or rectangular array schemes, which is described in further detail with respect to FIGS. 2A through 3B. For example, antenna arrays may be out of alignment, which may include a linear off-axis displacement or mis-alignment of rotational angles between the antenna arrays. A wireless device may apply phase precompensation to correct the linear axis displacement, the rotational angle mis-alignment, or both for multiple antenna arrays, such as an antenna array of each wireless device in MU-MIMO communication schemes.

Figure 2A:
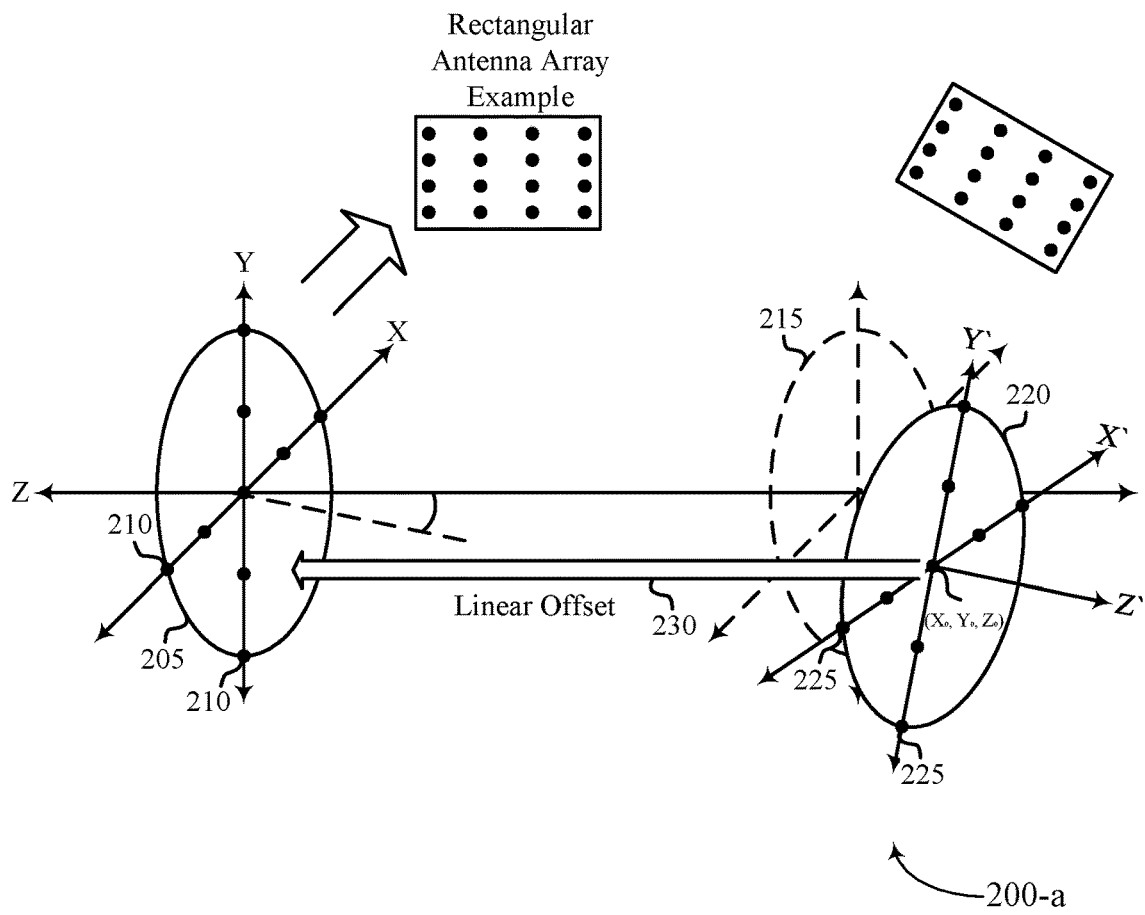
FIGS. 2A, 2B, 3A, 3B, and 4 illustrate examples of antenna array configurations that supports phase precompensation for MU-MIMO antenna mis-alignment in accordance with one or more aspects of the present disclosure.
Figure 2B:
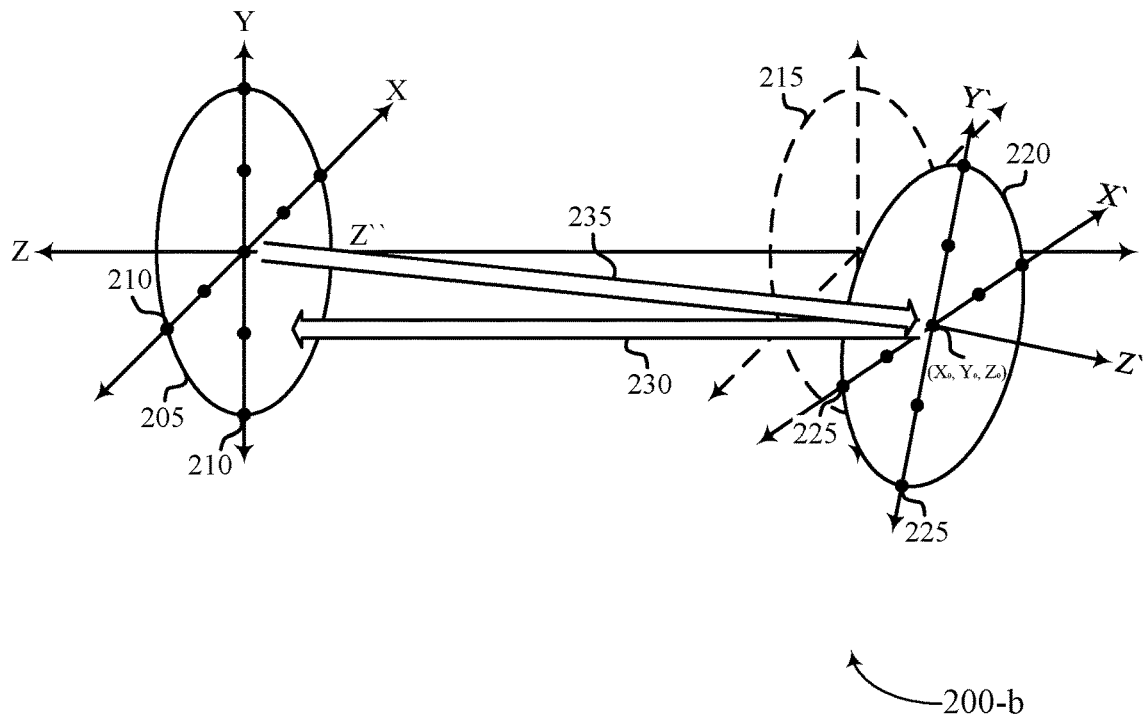

FIGS. 2A and 2B illustrates an example of an antenna array configuration 200-a and an antenna array configuration 200-b that support phase precompensation for MU-MIMO antenna mis-alignment in accordance with one or more aspects of the present disclosure. The antenna array configuration 200-a and the antenna array configuration 200-b may implement aspects of or be implemented by the wireless communications system 100. The antenna array configuration 200-a and the antenna array configuration 200-b may include a second antenna array 205 associated with a second device and a first antenna array 220 associated with a first device. In some aspects, the first device or the second device (or both) may be a UE or a network entity (or some combination), which may be examples of the corresponding devices described herein.

The techniques described herein may be implemented by the first and second devices to align or compensate for misalignment between the second antenna array 205 and the first antenna array 220. Accordingly, the techniques described herein may be applied for UE-to-UE, network entity-to-network entity, UE-to-network entity, or network entity-to-UE antenna array alignment or compensation between the first antenna array 220, and the second antenna array 205, or both.

As discussed herein, wireless communication systems may be configured to support OAM and other LoS-MIMO schemes to increase throughput over a short distance LoS deployment scenario. These deployment scenarios may include the first device installing, establishing, or otherwise configuring the first antenna array 220 and the second device installing, establishing, or otherwise configuring the second antenna array 205 such that each antenna array is coplanar with respect to the other antenna array. That is, each antenna array may include a plurality of antenna elements (for example, antenna elements 210 of the second antenna array 205 and antenna elements 225 of the first antenna array 220).

Each antenna array may have a circular shape, rectangular shape, oval shape, or square shape, among other examples. In some cases, when installing such antenna arrays, the planar face of each antenna array may be coplanar with respect to the planar face of the other antenna array along the Z axis, and may be rotated such that each antenna element may be aligned with a corresponding antenna element of another antenna array (e.g., for antenna pairs) along the X and Y axis and may be rotated similarly around the Z axis. This coplanarity and rotation may support Fresnel diffraction, which may occur when a source and observation point for an electron source are located a finite distance apart preventing planar waves. Fresnel diffraction may provide multiple channels for supporting the MIMO communications with LoS.

Alignment of the receiving plane to the transmitting plane (e.g., alignment of the planar face of the second antenna array 205 and the first antenna array 220) may be important aspects for such LoS MIMO schemes, regardless of whether OAM (e.g., concentric circles) or rectangular antenna arrays are used. Without such alignment, the modes in OAM and LoS-MIMO lose orthogonality with respect to each other, thus disrupting communications.

In some examples, misalignment of the first antenna array 220 and the second antenna array 205 may occur (e.g., at least initially), and therefore an alignment procedure before communications sessions may be established between the first device and the second device. Misalignment in some scenarios may include a linear offset (e.g., a linear off-axis) in which the planar face of the antenna arrays may be offset along the Z axis, as well as rotational offsets in which the planar face of the antenna arrays may be rotated around the Z axis or the planar face of one antenna array may be tilted or otherwise leans such that the planar face of the antenna array is not parallel to the planar face of the other antenna array. Accordingly, various degrees of freedom may be present in the misalignment of the antenna arrays for the linear axis, the rotational offsets, or both. If such misalignment is present, a transformation matrix may have numerous correlated variables, which may be difficult to analyze, correct, or both for the misalignment between the first antenna array 220 and the second antenna array 205.

In some examples, FIG. 2A may be an example of a misalignment between antenna arrays. The second antenna array 205 may be configured such that the planar face of the second antenna array 205 may be perpendicular to the Z axis and rotated such that the antenna elements 210 are positioned along the X and Y axis. An example placement for alignment for the first antenna array 220 may be illustrated in dashed lines as antenna array placement 215. That is, antenna array placement 215 may illustrate a placement of the first antenna array 220, such that the first antenna array 220 may be aligned with respect to the second antenna array 205. However, there may be misalignment between the first antenna array 220 and the second antenna array 205. Specifically, the misalignment may include the first antenna array 220 being positioned below the Z axis, and therefore having a corresponding linear offset 230. That is, a transmission from a center antenna element 225 of the first antenna array 220 may not align with the corresponding center antenna element 210 of the second antenna array 205.

In some cases, the first antenna array 220 may be rotated about the Z axis such that the X and Y axis of the first antenna array 220 (e.g., X' and Y') may not be aligned with the corresponding X and Y axis of the second antenna array 205. Furthermore, the first antenna array 220 may be tilted along the X axis, Y axis, or both such that the planar face of the second antenna array 205 may not be parallel with the planar face of the first antenna array 220. Again, if such misalignment is present, the variables of the transformation matrix may be intertwined (e.g., correlated) to such a degree that analyzing or otherwise quantifying the misalignment between the second antenna array 205 and the first antenna array 220 may be extremely difficult, and potentially sometimes prohibitively difficult. For example, it may not be feasible to have a reasonable sized set of codewords to use for precompensation due to the high dimensions (e.g., due to the numerous degrees of freedom between the antenna array's misalignment). Moreover, physical alignment of the second antenna array 205 to the first antenna array 220 may be difficult in some mobility use cases. Finally, in some cases it may be impractical to physically place a lens or other physical alignment aid between the second antenna array 205 and the first antenna array 220 to aid in alignment.

Figure 3A:
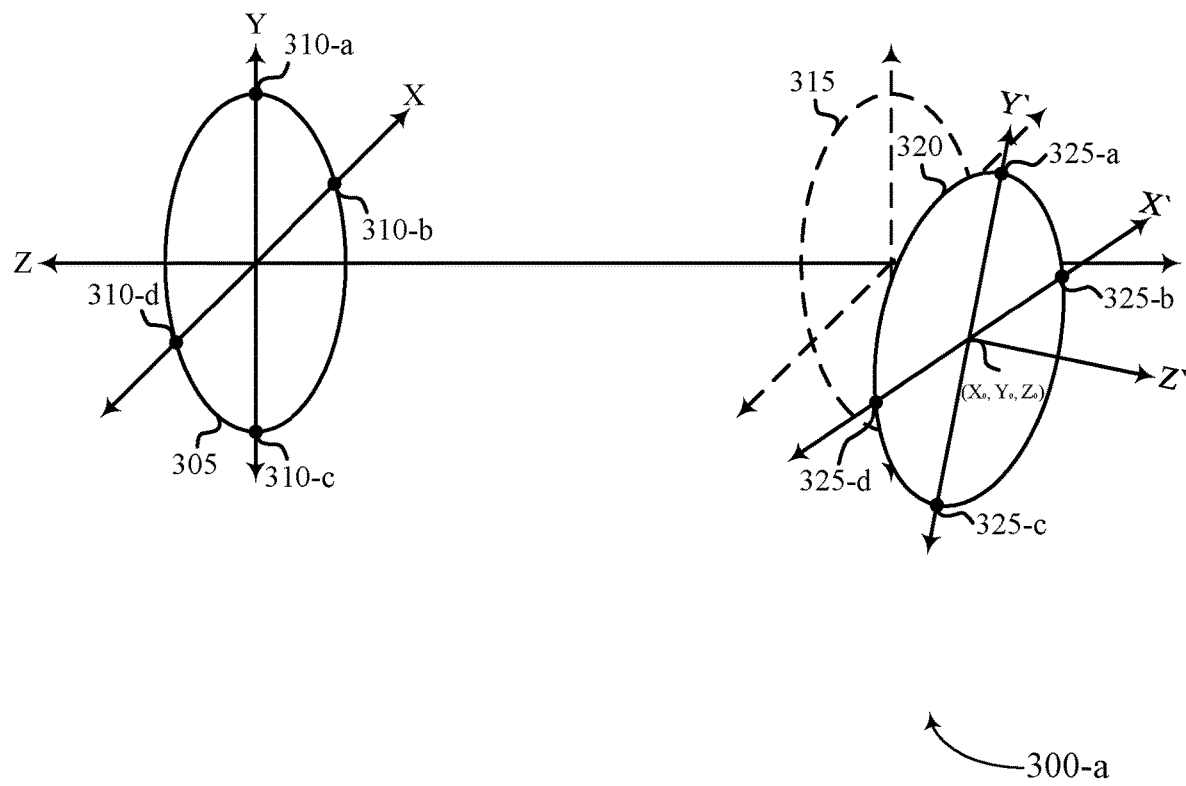
Figure 3B:
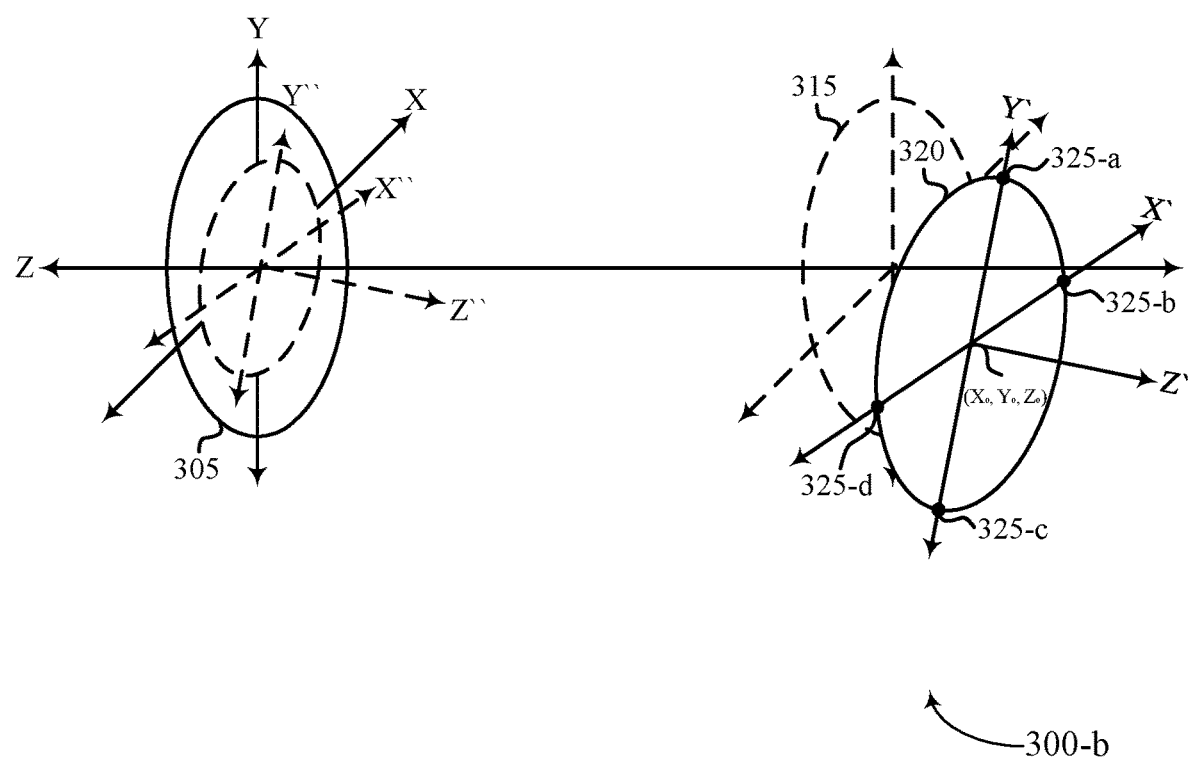

Accordingly, a wireless device may find and apply accurate phase precompensation for MU-MIMO communications with one or more other wireless devices. For example, the wireless device may apply phase precompensation when transmitting (e.g., the wireless device is a transmitting device, which may be the second device in this example) to compensate for the linear axis offset as well as the rotational offsets between the second antenna array 205 and the first antenna array 220. Broadly, the linear axis offset (e.g., the off-axis offset) may initially be estimated based on phase measurements at the center antenna arrays along the X and Y axis using a reference signal transmitted from the second device. After the linear offset has been estimated and compensated for, the rotational offsets may then be estimated and compensated for using multiple reference signals transmitted from the peripheral antenna elements 210 of the second antenna array 205. For example, the rotational offsets may be estimated based on phase measurements among the antenna element pairs along the X and Y axis using reference signals transmitted from the corresponding antenna array antenna elements. Accordingly, the phase terms from the rotational offsets may no longer be tangled with the linear offset, which supports sequentially estimating and correcting for the linear offset, rotational offsets, or both. FIGS. 2A and 2B illustrate examples of the linear offset estimation and precompensation aspects of the described techniques, with FIGS. 3A and 3B illustrating examples of the rotational offsets estimation and precompensation aspects of the described techniques. Further, although FIGS. 2A and 2B illustrate examples of a single angular offset, a wireless device may apply different phase precompensation based on offset estimations for multiple devices in MU-MIMO communication systems, which is described in further detail with respect to FIG. 4.

In some examples, one or more devices may transmit one or more reference signals from a central or center antenna element of respective antenna arrays. For example, a second wireless device may transmit reference signals from a center antenna element 210 of the second antenna array 205 of the second device. The second wireless device may transmit the reference signals to a corresponding central or center antenna element 225 of the first antenna array 220 of the first device (e.g., the corresponding antenna pair). The first device may receive the reference signals at the first antenna element 225 of the first antenna array 220 transmitted from the one or more devices. Accordingly, the first device may measure a phase of each reference signal from the one or more devices to determine phases for each wireless device. Based on the phase measurements, the first device may then estimate the linear offset between the first antenna array 220 and any other antenna arrays for the one or more wireless devices, such as the second antenna array 205.

For example, the first device may determine the difference between the distance between the first antenna element 225 and the second antenna element 225 and the distance between other antenna elements 210 and the second antenna element 225 along the linear axis perpendicular to the plane, or the planar face, of the second antenna array 205. The first device may not directly determine the distance between the respective antenna elements, but the first device may estimate the difference in the distances based on the phase measurements in order to determine the linear offsets. The first device may compare a physical distance between the center of the first antenna array 220 and the center of the second antenna array 225 along the linear axis to estimate or calculate the linear offset. That is, the distance may correspond to the horizontal distance along the horizontal axis and a vertical distance along a vertical axis. The horizontal axis and the vertical axis (e.g., the X and Y planes, respectively) may be perpendicular to the plane of the second antenna array 205.

In some aspects, rectangular coordinates may be used for the algorithms, although the results may be easy applicable to OAM and Polar coordinates. The coordinates for the receive plane (e.g., for the first antenna array 220) may have their origin at $(X_0, Y_0, Z_0)$ and $(-\gamma, -\beta, -\alpha)$ with respect to the X-, Y-, and Z-axis. The coordinates for the transmit plane (e.g., for the second antenna array 205) may be at a rotational offset of $(\gamma, \beta, \alpha)$ with respect to the Z-, Y-, and X-axis, respectively.

With respect to coordinate transform (for example, with respect to the rotation matrix), a point with receive plane coordinates of (x', y', z') has its coordinates in the transmit plane as according to Equation (1) below:

$$\begin{bmatrix} x \\ y \\ z \end{bmatrix} = \begin{bmatrix} x_0 \\ y_0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma + \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \quad (1)$$

In a direction solution approach to estimating/compensating for the misalignment, the coordinates $X_0, Y_0, Z_0, \gamma, \beta, \alpha$ leave six unknown variables to solve for, which may be difficult to solve for given the degree of freedom between the antenna arrays.

However, the techniques described herein provide an iterative approach to solve for these variables, to pre-compensate for the misalignment between the first antenna array 220 and the second antenna array 205. This may include making the transmit plane (e.g., the second antenna array 205) appear as (x", y", z") to the receive plane (e.g., the first antenna array 220).

As discussed herein, this may include the first device measuring a first phase of each reference signal on the first set of reference signals. This may include projecting the origin of the receive plane to the transmit plane along the Z axis (e.g., corresponding to the linear offset 230). Estimating the linear offset for each wireless device in the MU-MIMO system may include the first device measuring (e.g., based on one or more phase distances for each wireless device) the distance between the antenna of the first wireless device and the antenna along the linear axis perpendicular to the plane of one or more antenna arrays of the other wireless devices.

For example, the first wireless device may estimate the linear offset 230 between the first wireless device and the second wireless device based on measuring the distance between the antenna along the linear axis perpendicular to the plane of the second antenna array 205. For example, this may include the distance between the receive plane (0,0,0) and the transmit plane $(k_x, d_x, 0,0)$ and the distance between the receive plane (0,0,0) and the transmit plane (0,0,0).

In some examples, the distance between the receive plane (0,0,0) (e.g., the center of the first antenna array 220) and the transmit plane $(k_x, d_x, 0,0)$ and the distance between the receive plane (0,0,0,) and the transmit plane (0,0,0) may be as according to Equation (2) below:

$$\approx \frac{-2k_x d_x x_0 + k_x^2 d_x^2}{2z_0} \quad (2)$$

and the distance between the receive plane (0,0,0) and the transmit plane $(k_y, d_y, 0,0)$ and the distance between the receive plane (0,0,0) and the transmit plane (0,0,0) may be as according to Equation (3) below:

$$\frac{-2k_y d_y y_0 + k_y^2 d_y^2}{2z_0}. \quad (3)$$

The receive plane (0,0,0) may be the same as $(X_0, Y_0, Z_0)$ in the transmit plane coordinates. With $d_x$ and $d_y$ known, the given observations at multiple $k_x$ and $k_y$, $x_0$, $y_0$, and $z_0$ can be solved using linear regression. To remove phase ambiguity (e.g., based on $2\pi$), the wireless device may perform dense frequency sampling using the reference signal, or may use extra units close to the origin (e.g., additional centrally located antenna elements), or both, for phase de-ambiguity because multiple modes may use Equation (4) below:

$$\frac{d_{max}^2}{\lambda z_0} > 1. \quad (4)$$

The multiple transmit units (e.g., antenna elements) used for the phase measurements may not be equally spaced along the two axis, as long as their respective locations are known to the receive device, such as the second device in this example. As discussed, reference signals may be used for the transmitting units (e.g., the antenna elements) to support the phase measurements with each unit being along the two axis (e.g., the X and Y axis).

In some cases, the wireless device may estimate the linear offset according to the distance between the receive plane (0,0,0) and the transmit plane $(k_x d_x, 0,0)$ and the distance between the receive plane (0,0,0) and the transmit plane$(-k_x d_x, 0,0)$ according to Equation (5) below:

$$\approx \frac{-2k_x d_x x_0}{z_0}, \quad (5)$$

and the distance between the receive plane (0,0,0) and the transmit plane (0, $k_y d_y$, 0) and the distance between receive plane (0,0,0) and transmit plane (0, $-k_y d_y$, 0) being as according to Equation (6) below:

$$\approx \frac{-2k_y d_y y_0}{z_0}. \tag{6}$$

With variables $k_x$, $k_y$, $d_x$ and $d_y$ known, the variables $$\frac{x_0}{z_0}$$

and $$\frac{y_0}{z_0}$$

may be solved. The variable $z_0$ by itself may or may not be used for alignment. This example also uses reference signals for the transmit units used for phase measurements (e.g., two units at the far end of each of the two axis).

To remove ambiguity in the phase measurements, the total phase of reference signals (e.g., the first set or second plurality of reference signals or both) from (x, y, 0) at a first sub-carrier frequency, $f_1$, may be calculated according to Equation (7) below:

$$\frac{2\pi f_1 d_{(x,y)}}{c} = \varphi_1(f_1) + m_{1,f_1}(2\pi). \tag{7}$$

The total phase of reference signal from (−x, y, 0) at sub-carrier $f_1$ may be calculated according to Equations (8) and (9) below:

$$\frac{2\pi f_1 d_{(-x,y)}}{c} = \varphi_2(f_1) + m_{2,f_1}(2\pi) \tag{8}$$

$$\varphi_1(f_1) - \varphi_2(f_1) + (m_{1,f_1} - m_{2,f_1})(2\pi) = \frac{2\pi f_1}{c}(d_{(x,y)} - d_{(-x,y)}). \tag{9}$$

In a typical use environment of passive MIMO, reference signals may be placed densely in a frequency domain, such as a frequency domain between $f_1$ and a second sub-frequency, $f_2 \cdot |f_1 - f_2|$ may be on the order of sub-carrier spacing, or physical resource block (PRB) size, among other examples. In some cases, $|f_1 - f_2|$ may be on the order of $10^2$ kilohertz (kHz), and a corresponding ambiguity length $|(d_{(x,y)} - d_{(-x,y)})|$ may be on the order of $10^3$ meters (m), which may be sufficient to remove some, or all, phase ambiguity. Accordingly, this may include reference signal samples in the frequency domain with a density of the order of $10^2$ kHz, and a receiver using multiple sub-carriers in the reference signal to remove phase ambiguity. Phase ambiguity may be removed in an estimated differential distance such as $|(d_{(x,y)} - d_{(-x, y)}|$, although $d_{(x,y)}$ and $d_{(-x,y)}$ themselves may still have some degree of ambiguity. The first set of reference signals may be transmitted at a first frequency and the second plurality of reference signals may be transmitted at a second frequency that is within a frequency threshold of the first frequency.

In some examples, the first device may determine the phase accuracy for the linear offset, the rotational offsets, or both, and may adjust the first antenna array 220 or the second antenna array 205 (or both) accordingly.

In some cases, the first device may transmit or otherwise convey an indication of a linear offset to respective wireless devices. For example, the first device may transmit an indication of the linear offset 230 to the second device. The indication may be transmitted along with an indication of the rotational offsets, which is discussed in further detail with reference to FIGS. 3A and 3B, or may be provided initially such that the second device may adjust communication metrics to compensate for the linear offset before measuring and compensating for the rotational offsets.

As illustrated in FIG. 2B, the second device may adjust or otherwise modify various metrics used for communications with the first wireless device, such as for the first antenna array 220 and the second antenna array 205. Additionally or alternatively, the first wireless device, the second wireless device, or both may adjust or otherwise modify various metrics for communications with one or more other wireless devices (e.g., for MU-MIMO), which is described in further detail with respect to FIG. 4. The alignment procedure may be based on the second device receiving the indication (e.g., feedback) from the first device indicating the calculated offset of x0, y0, and z0. The second device may apply, for $(k_x, d_x, k_y, d_y)$, an extra phase of the following, in effect steering the beam 235 toward the origin of the receive plane as according to Equation (10) below:

$$-\frac{\pi(-2k_x d_x x_0 + k_x^2 d_x^2 - 2k_y d_y y_0 + k_y^2 d_x^2 k_y^2)}{\lambda z_0}. \tag{10}$$

Accordingly, adjusting the metrics used for communications between the first antenna array 220 and the other antenna arrays (e.g., the second antenna array) may include the second device applying various beam steering, beamforming, or other techniques in order to steer beam 235 from the center of the second antenna array 205 to the first antenna array 220. In some aspects, the second device may adjust a first subset of the metrics based on the indication before transmitting a second plurality of reference signals used for rotational offset estimation and measurement.

FIGS. 3A and 3B illustrate examples of an antenna array configuration 300-*a* and an antenna array configuration 300-*b* that supports phase precompensation for MU-MIMO antenna mis-alignment in accordance with one or more aspects of the present disclosure. The antenna array configuration 300-*a* and the antenna array configuration 300-*b* may implement aspects of or be implemented by the wireless communications system 100, the antenna array configuration 200-*a*, the antenna array configuration 200-*b*, or any combination thereof. The antenna array configuration 300-*a* and the antenna array configuration 300-*b* may include a second antenna array 305 of a second device and a first antenna array 320 of a first device. In some examples, the first device, the second device, or both may be a UE or a network entity, which may be examples of the corresponding devices described herein.

In some cases, the antenna array configuration 300-*a* and the antenna array configuration 300-*b* may be misaligned, as described with reference to the antenna array configuration 200-a and the antenna array configuration 200-b. As described with reference to FIGS. 2A and 2B, one or more wireless devices, such as the second device, may transmit or otherwise convey one or more reference signals to a first antenna of the first antenna array 320 (e.g., from the second antenna of the second antenna array 305). The first device may receive the reference signals from one or more wireless devices including the second wireless device and may measure a phase of each reference signal. Based on the phases, the first device may estimate the linear offset between a first antenna array 320 and one or more additional antenna arrays, such as the second antenna array 305. The first device may transmit or otherwise provide an indication of a linear offset to the one or more wireless devices including the second device. The wireless devices may adjust various metrics, such as beam steering, beamforming, weighting factors for MU-MIMO communications. The communications may be uplink or downlink transmissions between the first antenna array 320 and the one or more additional antenna arrays (e.g., the second antenna array 305), which is described in further detail with respect to FIG. 4.

In some examples, a first device may transmit or otherwise provide the indication of the linear offset (e.g., the actual linear offset, the first phase, or both) before measuring and estimating one or more rotational offsets between the first antenna array 320 and the additional antenna arrays (e.g., second antenna array 305). In some other examples, the first device may provide the indication of the linear offset with an indication of one or more rotational offsets. Antenna array configuration 300-a and antenna array configuration 300-b may illustrate examples in which a wireless device (e.g., the first device) provides the indication of the linear offset to one or more additional devices, such as the second device, which may adjust the metrics to compensate for the linear offset prior to transmitting reference signals used for measuring and estimating the rotational offsets.

With reference to antenna array configuration 300-a, orientation between the first antenna array 320 and the second antenna array 305 may be misaligned along the linear access (e.g., along the Z access corresponding to the linear offset) as well as including one or more rotational offsets (e.g., rotational angle offsets). The rotational offsets may correspond to the first antenna array 320 being rotated about the Z axis such that the antenna elements pairs are misaligned. For example, antenna element 310-a of the second antenna array 305 may be misaligned with respect to the corresponding antenna elements 325-a of the first antenna array 320. Similarly, antenna elements 310-b may be misaligned with reference to antenna element 325-b, antenna element 310-c may be misaligned with reference to antenna elements 325-c, and antenna elements 310-d may be misaligned with reference to antenna elements 325-d. Such misalignment may also be based on the planer face of the first antenna array 320 being non-coplanar with respect to the planer face of the second antenna array 305. That is, the first antenna array 320 may be positioned in a manner inconsistent with the antenna array placement 315.

In some examples, the rotational offsets ay be referred to in terms of rotational angle offsets (e.g., rotational angles along one or more axis at the first antenna array 320 relative to the second antenna array 305). Various types of coordinate systems may be used to estimate the offsets (e.g., Cartesian, cylindrical, or spherical coordinate systems), including the rotational offsets. As such, the rotational offsets may be represented as an angle (e.g., in degrees) or in another type of rotational measurement representation.

With reference to the antenna array configuration 300-b, the second device may transmit a second set of one or more reference signals to antennas of the first antenna array 320 and from antennas of the second antenna array 305. For example, the second device may transmit a reference signal from antenna element 310-a to antenna element 325-a, another reference signal from antenna element 310-b to antenna element 325-b, another reference signal from antenna element 310-c to antenna element 325-c, another reference signal from antenna element 310-d to antenna elements 325-d, or any combination thereof. Accordingly, the antennas of the second device may be located at non-central locations of the first antenna array 320, such as along the peripheral edge of each antenna array.

The first device may receive the second set of reference signals and measure a second set of phases for the second probably reference signals. That is, the first device may measure the phase of the reference signal transmitted from antenna element 310-a to antenna element 325-a, and so forth. Based on the second phases, the first device may estimate one or more rotational offsets (e.g., angles) between the first antenna array 320 and the second antenna array 305. In some examples, the first device may estimate the rotational offsets based on adjusting for the linear offset. That is, the second device may apply the adjustments to the metrics if transmitting the second set of reference signals to eliminate or otherwise pre-compensate for the linear offset misalignment.

Accordingly, with the origin of the receive plain coordinate on the transmitting plane Z axis adjusted for, the rotational offsets may be calculated according to Equation (11) below:

$$\begin{bmatrix} x \\ y \\ z \end{bmatrix} = \begin{bmatrix} 0 \\ 0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\sin\gamma + \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix}. \quad (11)$$

In some cases, if $\beta=0$ and $\gamma=0$, the following four distances may be considered equal: distance [receive plane ($d'_x$, 0,0) and transmit plane ($d_x$, 0,0)], distance [receive plane ($-d'_x$, 0,0) and transmit plane ($-d_x$, 0,0)], distance [receive plane (0, $d'_y$, 0) and transmit plane (0, $d_y$, 0)], and distance [receive plane (0, $-d'_y$, 0) and transmit plane (0, $-d_y$, 0)].

Rotational offset compensation for symmetric transmit plane and receive plane channel reciprocity may be based on the correlation between the antenna elements of the antenna arrays. For example, if there are a same number of transmit plane and receive plane units (e.g., antenna elements), and each unit in the transmit plane (x, y, 0) is paired with a corresponding receive plane unit (x', y', z'), then the following may be calculated: the distance between (x, y, z) and (x', y', z') and the distance between (0, 0, 0) (transmit plane) and (0, 0, 0) (receive plane). One or more wireless devices may calculate the distance, or phase difference, between the wireless devices and the first device. The one or more wireless devices may transmit the phase difference to the first wireless device in a feedback message. If there is channel reciprocity, the second device may directly estimate the phase difference based on transmissions from the first device.

Accordingly, the first device may measure the second plurality of phases and transmit or otherwise convey an indication of the rotational offsets (e.g., the rotational offsets, the second phases, or both) to the second device. The second device may adjust or otherwise modify metrics used for communications between the first antenna array 320 and the second antenna array 305 based on the indication.

For example, for each transmitter at (x, y, 0) in the transmit plane, a wireless device may find a corresponding (x", y", z") at the rotated transmit plane according to a rotation matrix, in which the matrix inverse can be found in closed form by reversing the rotation angles. The propagation path length may be found using: $\text{sign}(z'') \sqrt{(x-x'')^2+(y-y'')^2+z''^2}$. Pre-compensating a phase may be equal to $$-\frac{2\pi}{\lambda} \text{sign}(z'') \sqrt{(x-x'')^2+(y-y'')^2+z''^2}.$$

In some cases, an accuracy of a phase difference may be inversely proportional to a signal-to-noise ratio (SNR). For example, a wireless device may accurately estimate the phase difference to around $$1\frac{1}{\sqrt{SNR}}.$$

The phase difference may be small due to the nature of par-axial approximation. In some examples, coherent integration may be used to boost SNR or mitigate phase noise. In some other examples, non-coherent integration may be used to further increase the phase difference evaluation.

Accordingly, one or more wireless devices, such as the first device, the second device, or both, may determine the noise level for the channel between the first antenna array 320 and the second antenna array 305, which may determine the phase accuracy for the measurements.

Moreover, the phase noise may hamper any phase evaluation of a same receive plane unit across time. In some examples, a wireless device may maintain such comparison within the "coherence time" due to phase noise. Additionally or alternatively, the wireless device may avoid phase evaluation across time. For example, evaluation across time may be replaced by evaluation across two receive units at a same time. Phase noise may impact coherent integration time. Accordingly, the first device may evaluate the two or more phases measured for the reference signals based on the reference signals being communicated within a time threshold (e.g., the coherence time).

Figure 4:
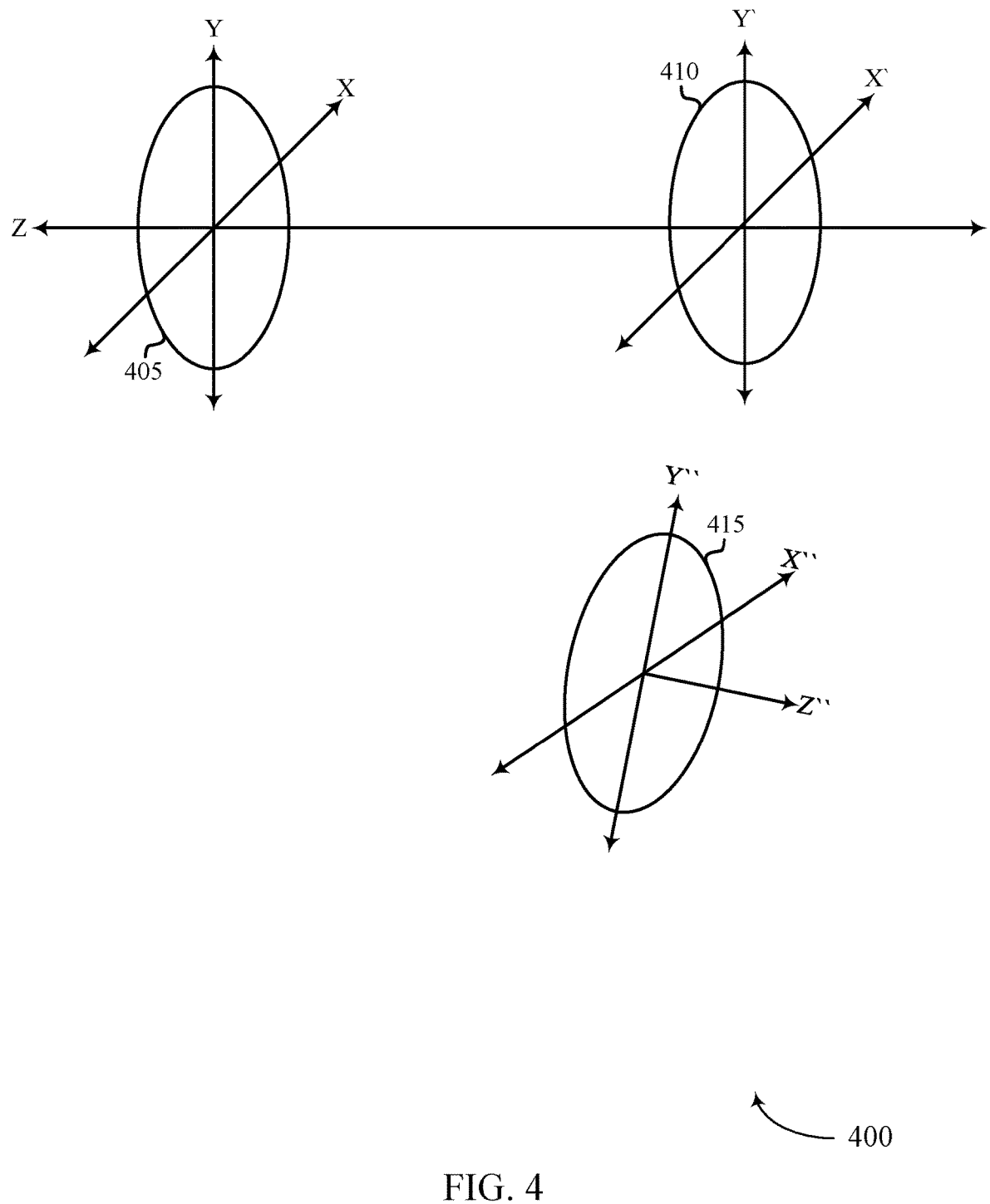

FIG. 4 illustrates an example of an antenna array configuration 400 that supports phase precompensation for MU-MIMO antenna mis-alignment in accordance with one or more aspects of the present disclosure. The antenna array configuration 400 may implement aspects of or may be implemented by the wireless communications system 100, the antenna array configuration 200-*a*, the antenna array configuration 200-*b*, the antenna array configuration 300-*a*, the antenna array configuration 300-*b*, or any combination thereof. The antenna array configuration 400 may include a first antenna array 405 of a first device, a second antenna array 410 of a second device, and a third antenna array 415 of a third device. The antenna array 405, the antenna array 410, and the antenna array 415 may be examples of antenna arrays as described with reference to FIGS. 1 through 3B. In some examples, the first device, the second device, the third device, or any combination thereof may be a UE or a network entity, which may be examples of the corresponding devices described herein.

In some examples, the antenna array configuration 400 may implement OAM and other LoS MIMO techniques. For example, the antenna array configuration may be implemented in a wireless backhaul communication system for communications across server racks in server farms. A circular antenna array, such as antenna array 405, antenna array 410, and antenna array 415, may generate an OAM waveform. Additionally or alternatively, the antennas may be oriented on concentric circles to generate an OAM waveform. Similar techniques may be applied to rectangular antenna arrays to provide MIMO in LoS situations.

MU-MIMO may enable simultaneous one-to-many transmissions, which may improve communication techniques for OAM, LoS-MIMO, or both. For example, in MU-MIMO communications, a single network device may communicate with multiple other wireless devices simultaneously. A central unit may communicate with multiple peripheral units in both an uplink and downlink direction. In some examples, the communication may be downlink centric in which there may be one transmitting entity and multiple receiving entities. For example, the first device may be a transmitting entity while the second and third devices may be receiving entities. In some other examples, the communication may be uplink MU-MIMO in which there may be multiple transmitting entities and one receiving entity. For examples, the first device may be a receiving entity while the second and third devices may be transmitting entities.

In some cases, one or more wireless devices may align a receive plane to a transmit plane for LoS MIMO schemes including OAM or rectangular array schemes, as described with reference to FIGS. 2A through 3B. For example, antenna array 415 may be out of alignment with antenna array 405, which may include a linear off-axis displacement or mis-alignment of rotational angles between the antenna arrays. As described with reference to FIGS. 2A and 2B, a wireless device may apply phase precompensation to correct the linear axis displacement. Additionally or alternatively, as described with reference to FIGS. 3A and 3B, a wireless device may apply phase precompensation to correct the rotational angle mis-alignment. In some cases, a wireless device may apply a phase precompensation for the linear axis displacement, the rotational angle misalignment, or both for multiple antenna arrays, such as an antenna array of each wireless device in MU-MIMO communication schemes.

In some examples, OAM and other LoS MIMO schemes may provide MIMO for a receiving entity. For example, the OAM scheme may provide MIMO for a second device with antenna array 410, which may be on a perpendicular propagation axis and may be perpendicular to that axis. Phase precompensation schemes may enable the same transmit entity to provide a similar waveform to a receiving entity which is off-axis and has rotation angles with respect to the perpendicular propagation axis, such as a third device with antenna array 415. This provides for implementation of MU-MIMO techniques.

In some cases, a wireless device may approximate a channel response of modes from a circle according to $$J_m\left(\frac{kRx}{z}\right),$$

where R and x are radius of a transmitter and receiver, z is the propagation distance, and Jm( ) is a first kind of Bessel function. Each OAM mode may have a divergence angle, as represented by a first maximum of Bessel functions. To compensate for an axis offset, a transmitter may apply an extra phase for a transmit antenna, as described with reference to FIGS. 2A through 3B. For example, if a first device is transmitting to a third device (e.g., antenna array 415) using antenna array 405, the first device may solve for the values of an offset between an origin of the antenna array 415 and the origin of the antenna array 405. The first device may apply an extra phase for transmissions to the third device, in effect steering the beam toward the origin of receiving device (e.g., the third device).

As described with reference to FIGS. 3A and 3B, a transmitting device may solve for rotational angles for a transmission to one or more other wireless devices. A wireless device, such as the first device, may use precompensation to correct the off-axis entity with rotation for OAM schemes. The precompensation may effectively provide separate propagation angles different from the perpendicular axis. The wireless device may serve multiple entities simultaneously in frequency and potentially with a same OAM mode.

In some examples, angular separation between two wireless devices (e.g., entities) may correlate to the highest angular mode the transmitting device may use. Each OAM mode may have a divergence angle, which may be larger for higher modes. The radius of each mode at a receiving device may depend on a distance and a circle which transmits the modes. A smaller circle at a transmitting device for a mode may cause a smaller circle of that mode at a receiving device.

In some examples, a wireless device may perform mode designation for OAM schemes. In some cases, the mode designation may be a single circle with a single angular mode, in which a Bessel function may calculate a divergence angle. In an extension of the single circle designation, each angular mode may be at a single circle, but multiple modes may be used at the same circle. In some other cases, multiple circles may be used for transmitting a particular angular mode. With this designation, a divergence angle may be approximated by assuming energy comes from a largest circle and then applying a Bessel function. In some examples, a wireless device may implement a radial modes in addition to, or as an alternative to, angular modes. The wireless device may approximate the divergence angle by assuming energy comes from the largest circle used by this radial mode and the associated angular mode In some cases, inter-user interference exists due to the signal energy failing to end at a finite radius. For example, there may be interference between simultaneous transmissions to and from multiple wireless devices (e.g., a transmission to or from the first device, the second, and third devices). Channel feedback from users may indicate the interference from signals to other users, from other users, or both. In some cases, a wireless device, such as the first device, may implement a sounding procedure for interference estimation. The sounding procedure may include transmission of reference signals to each wireless device one at a time. The receiving entities may report a channel response to the reference signals. For example, the first device may transmit reference signals to the second device and the third device one at a time. The second device and the third device may report a channel response back to the first device. The response may include a full response with a channel matrix (e.g., periodically) or a shortened version, which may be referred to as a simplified response. The simplified response may include the channel gain between each pair of circles between entities, the channel gain between each pair of modes between the entities, or both and may be sent more frequently than the full response.

In some cases, for uplink MU-MIMO, precompensation may be applied in a similar manner to downlink MU-MIMO. For example, reference signals may be sent from each entity one at a time (e.g., from the second device and the third device). The receiving entity may estimate a channel response. For example, the first device may estimate a channel response based on reference signals from the second and third devices. Scheduling for the uplink MU-MIMO communication may account for inter-user interference (e.g., based on the channel response).

Figure 5:
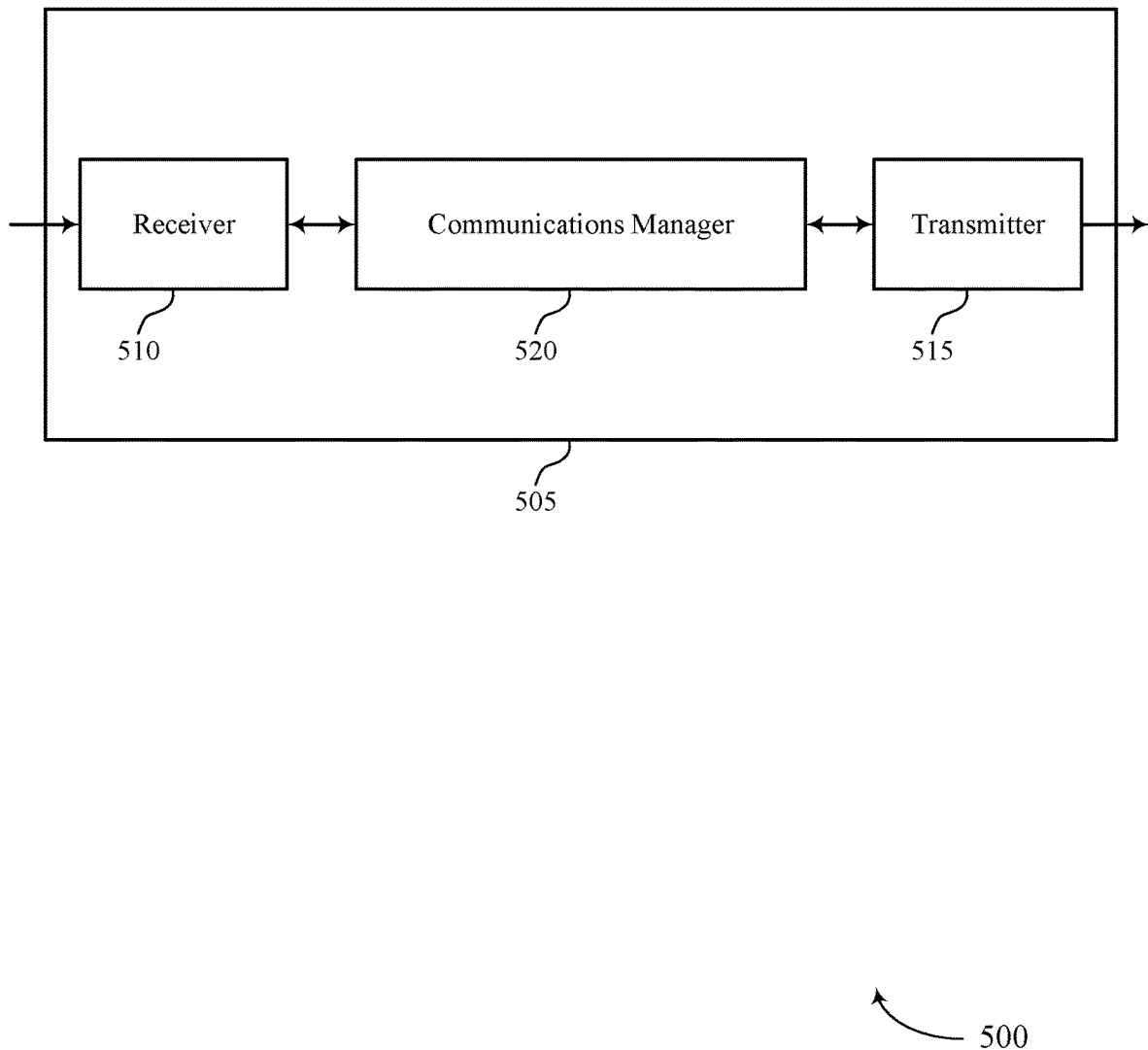
FIGS. 5 and 6 show block diagrams of devices that support phase precompensation for MU-MIMO antenna mis-alignment in accordance with one or more aspects of the present disclosure.

FIG. 5 shows a block diagram 500 of a device 505 that supports phase precompensation for MU-MIMO antenna mis-alignment in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to phase precompensation for MU-MIMO antenna mis-alignment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to phase precompensation for MU-MIMO antenna mis-alignment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of phase precompensation for MU-MIMO antenna mis-alignment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

For example, the communications manager 520 may be configured as or otherwise support a means for measuring a first axis offset between a first antenna array of the first wireless device and a second antenna array of a second wireless device. The communications manager 520 may be configured as or otherwise support a means for measuring a second axis offset between the first antenna array of the first wireless device and a third antenna array of a third wireless device. The communications manager 520 may be configured as or otherwise support a means for performing multiple user-multiple input multiple output (MU-MIMO) communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for a wireless device to apply precompensation for MU-MIMO communications with multiple wireless devices, which may provide for reduced processing, reduced power consumption, more efficient utilization of communication resources, and the like.

Figure 6:
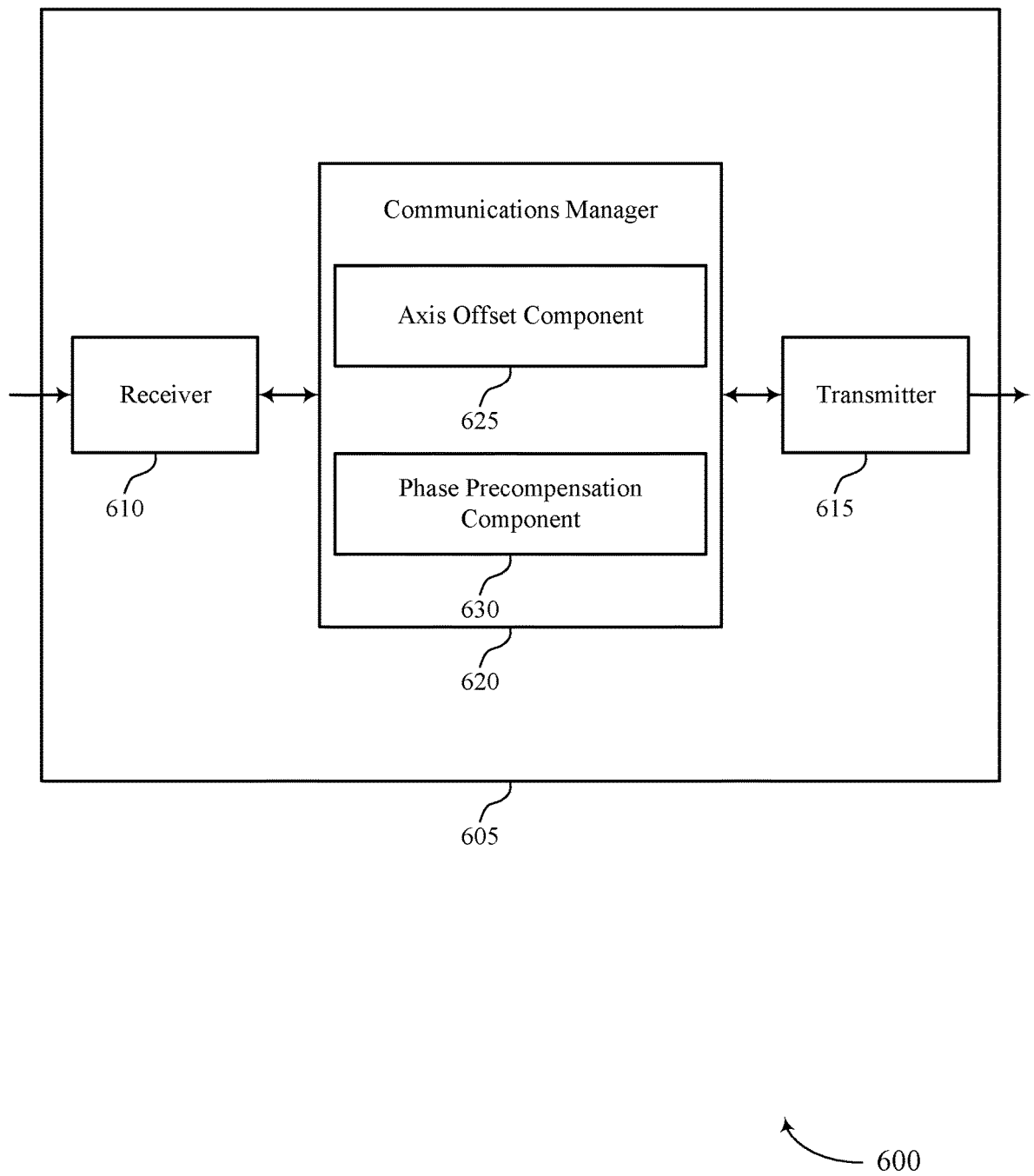

FIG. 6 shows a block diagram 600 of a device 605 that supports phase precompensation for MU-MIMO antenna mis-alignment in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to phase precompensation for MU-MIMO antenna mis-alignment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to phase precompensation for MU-MIMO antenna mis-alignment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of phase precompensation for MU-MIMO antenna mis-alignment as described herein. For example, the communications manager 620 may include an axis offset component 625 a phase precompensation component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The axis offset component 625 may be configured as or otherwise support a means for measuring a first axis offset between a first antenna array of the first wireless device and a second antenna array of a second wireless device. The axis offset component 625 may be configured as or otherwise support a means for measuring a second axis offset between the first antenna array of the first wireless device and a third antenna array of a third wireless device. The phase precompensation component 630 may be configured as or otherwise support a means for performing MU-MIMO communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

Figure 7:
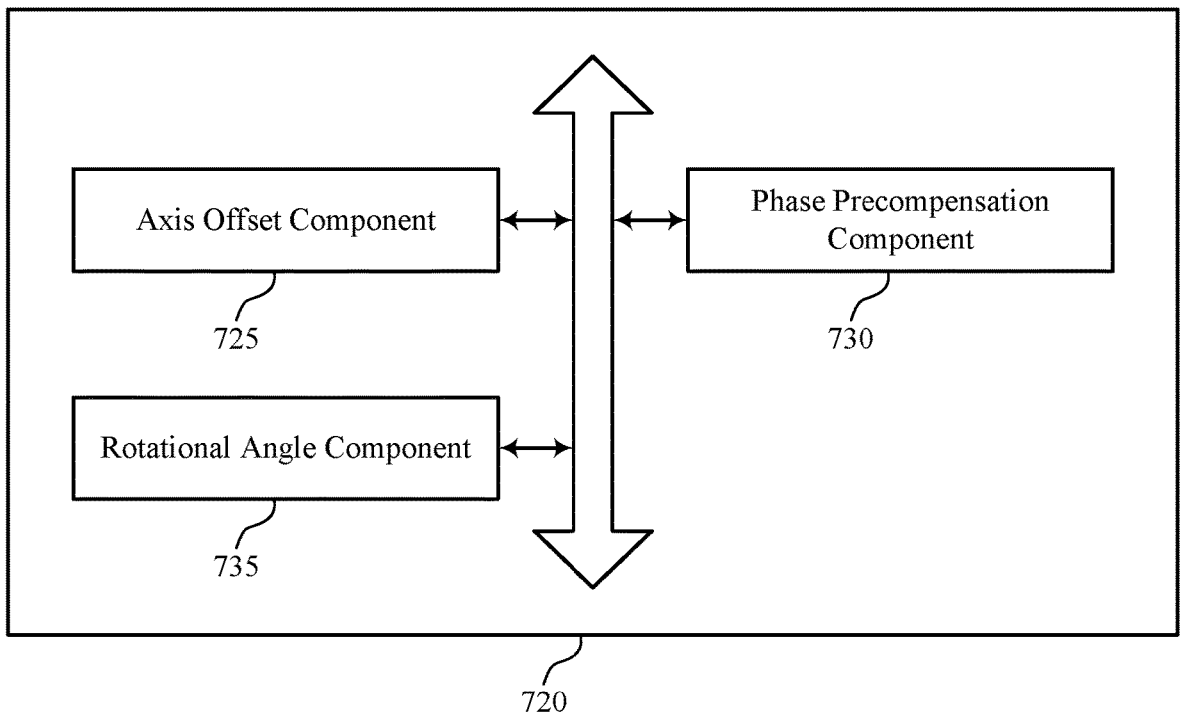
FIG. 7 shows a block diagram of a communications manager that supports phase precompensation for MU-MIMO antenna mis-alignment in accordance with one or more aspects of the present disclosure.

FIG. 7 shows a block diagram 700 of a communications manager 720 that supports phase precompensation for MU-MIMO antenna mis-alignment in accordance with one or more aspects of the present disclosure. The communications manager 720 may be an example of aspects of a communications manager 520, a communications manager 620, or both, as described herein. The communications manager 720, or various components thereof, may be an example of means for performing various aspects of phase precompensation for MU-MIMO antenna mis-alignment as described herein. For example, the communications manager 720 may include an axis offset component 725, a phase precompensation component 730, a rotational angle component 735, or any combination thereof. Each of these components may communicate, directly or indirectly, with one another (e.g., via one or more buses).

The axis offset component 725 may be configured as or otherwise support a means for measuring a first axis offset between a first antenna array of the first wireless device and a second antenna array of a second wireless device. In some examples, the axis offset component 725 may be configured as or otherwise support a means for measuring a second axis offset between the first antenna array of the first wireless device and a third antenna array of a third wireless device. The phase precompensation component 730 may be configured as or otherwise support a means for performing multiple user-multiple input multiple output (MU-MIMO) communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

In some examples, the phase precompensation component 730 may be configured as or otherwise support a means for determining the first phase precompensation based on a first rotational angle and the first axis offset, where the first rotational angle is between the first antenna array and the second antenna array. In some examples, the phase precompensation component 730 may be configured as or otherwise support a means for determining the second phase precompensation based on a second rotational angle and the second axis offset, where the second rotational angle is between the first antenna array and the third antenna array.

In some examples, the rotational angle component 735 may be configured as or otherwise support a means for estimating the first rotational angle based on one or more first phase measurements. In some examples, the rotational angle component 735 may be configured as or otherwise support a means for estimating the second rotational angle based on one or more second phase measurements.

In some examples, the rotational angle component 735 may be configured as or otherwise support a means for estimating the first rotational angle according to a first coordinate plane between the first antenna array and the second antenna array. In some examples, the rotational angle component 735 may be configured as or otherwise support a means for estimating the second rotational angle according to a second coordinate plane between the first antenna array and the third antenna array.

In some examples, to support performing the MU-MIMO communications, the phase precompensation component 730 may be configured as or otherwise support a means for transmitting, to the second wireless device, the communications associated with the second wireless device based on applying the first phase precompensation. In some examples, to support performing the MU-MIMO communications, the phase precompensation component 730 may be configured as or otherwise support a means for transmitting, to the third wireless device, the communications associated with the third wireless device based on applying the second phase precompensation, where the first antenna array includes a transmit antenna array and the second antenna array and the third antenna array include receive antenna arrays.

In some examples, to support performing the MU-MIMO communications, the phase precompensation component 730 may be configured as or otherwise support a means for receiving, from the second wireless device, the communications associated with the second wireless device based on applying the first phase precompensation. In some examples, to support performing the MU-MIMO communications, the phase precompensation component 730 may be configured as or otherwise support a means for receiving, from the third wireless device, the communications associated with the third wireless device based on applying the second phase precompensation, where the first antenna array includes a receive antenna array and the second antenna array and the third antenna array include transmit antenna arrays.

In some examples, the axis offset component 725 may be configured as or otherwise support a means for performing one or more first phase measurements on a first reference signal from the second wireless device via the second antenna array, where the first axis offset is obtained from a coordinate rotation of the one or more first phase measurements. In some examples, the axis offset component 725 may be configured as or otherwise support a means for performing one or more second phase measurements on a second reference signal from the third wireless device via the third antenna array, where the second axis offset is obtained from a coordinate rotation of the one or more second phase measurements.

In some examples, measuring the first axis offset is based on determining the first antenna array and the second antenna array are symmetric. In some examples, measuring the second axis offset is based on determining the first antenna array and the third antenna array are symmetric.

In some examples, measuring the first axis offset is based on comparing one or more first distances between the first wireless device and the second wireless device according to one or more first phase measurements. In some examples, measuring the second axis offset is based on comparing one or more second distances between the first wireless device and the third wireless device according to one or more second phase measurements.

In some examples, the axis offset component 725 may be configured as or otherwise support a means for comparing the one or more first distances during a first threshold time associated with the one or more first phase measurements. In some examples, the axis offset component 725 may be configured as or otherwise support a means for comparing the one or more second distances during a second threshold time associated with the one or more second phase measurements.

In some examples, the axis offset component 725 may be configured as or otherwise support a means for comparing the one or more first distances and the one or more second distances during a same duration based on a threshold distance between the second wireless device and the third wireless device being satisfied.

Figure 8:
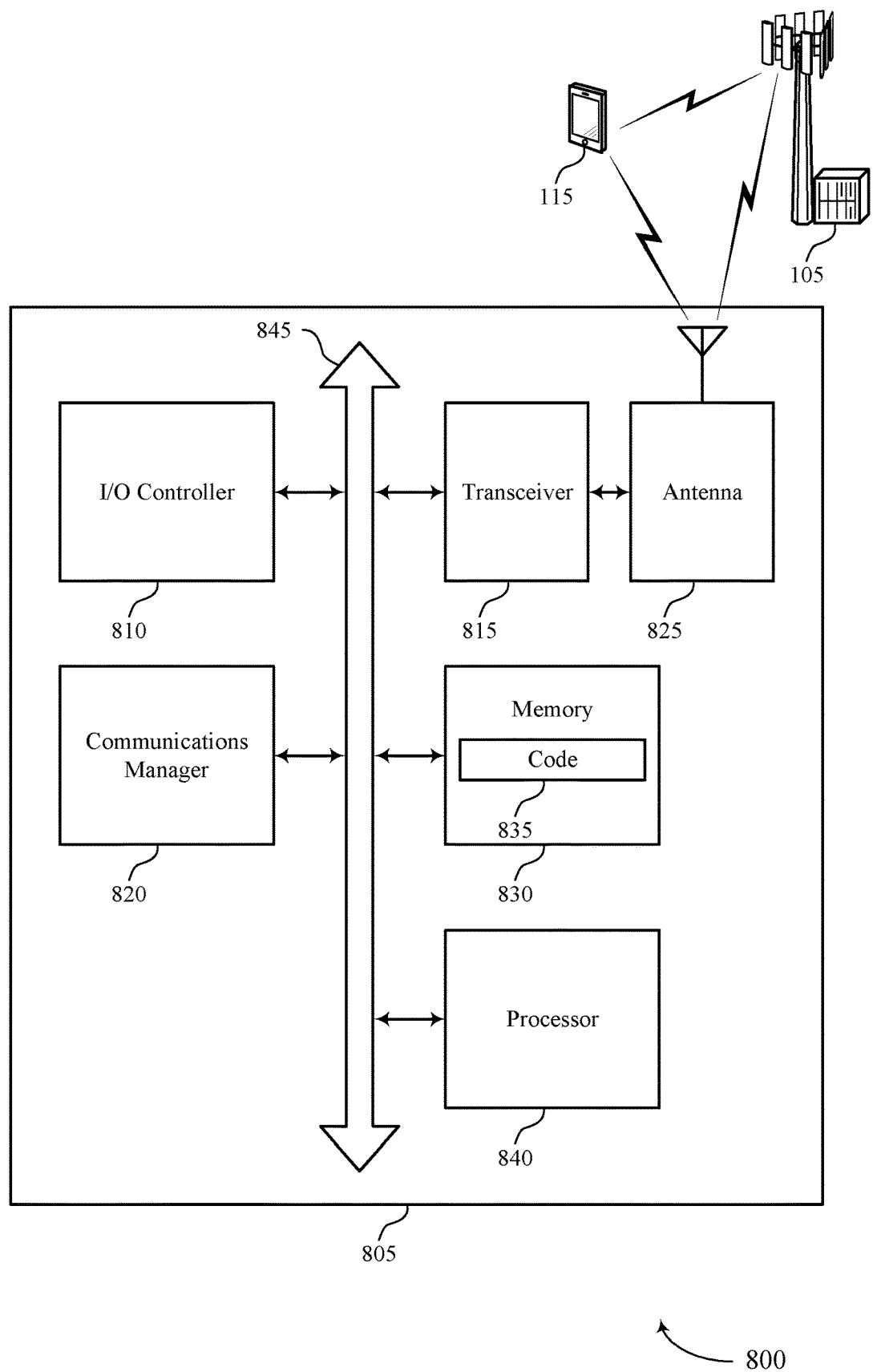
FIG. 8 shows a diagram of a system including a device that supports phase precompensation for MU-MIMO antenna mis-alignment in accordance with one or more aspects of the present disclosure.

FIG. 8 shows a diagram of a system 800 including a device 805 that supports phase precompensation for MU-MIMO antenna mis-alignment in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting phase precompensation for MU-MIMO antenna mis-alignment). For example, the device 805 or a component of the device 805 may include a processor 840 and memory 830 coupled with or to the processor 840, the processor 840 and memory 830 configured to perform various functions described herein.

For example, the communications manager 820 may be configured as or otherwise support a means for measuring a first axis offset between a first antenna array of the first wireless device and a second antenna array of a second wireless device. The communications manager 820 may be configured as or otherwise support a means for measuring a second axis offset between the first antenna array of the first wireless device and a third antenna array of a third wireless device. The communications manager 820 may be configured as or otherwise support a means for performing multiple user-multiple input multiple output (MU-MIMO) communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device.

By including or configuring the communications manager 820 in accordance with examples as described herein, the device 805 may support techniques for a wireless device to apply precompensation for MU-MIMO communications with multiple wireless devices, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of phase precompensation for MU-MIMO antenna mis-alignment as described herein, or the processor 840 and the memory 830 may be otherwise configured to perform or support such operations.

Figure 9:
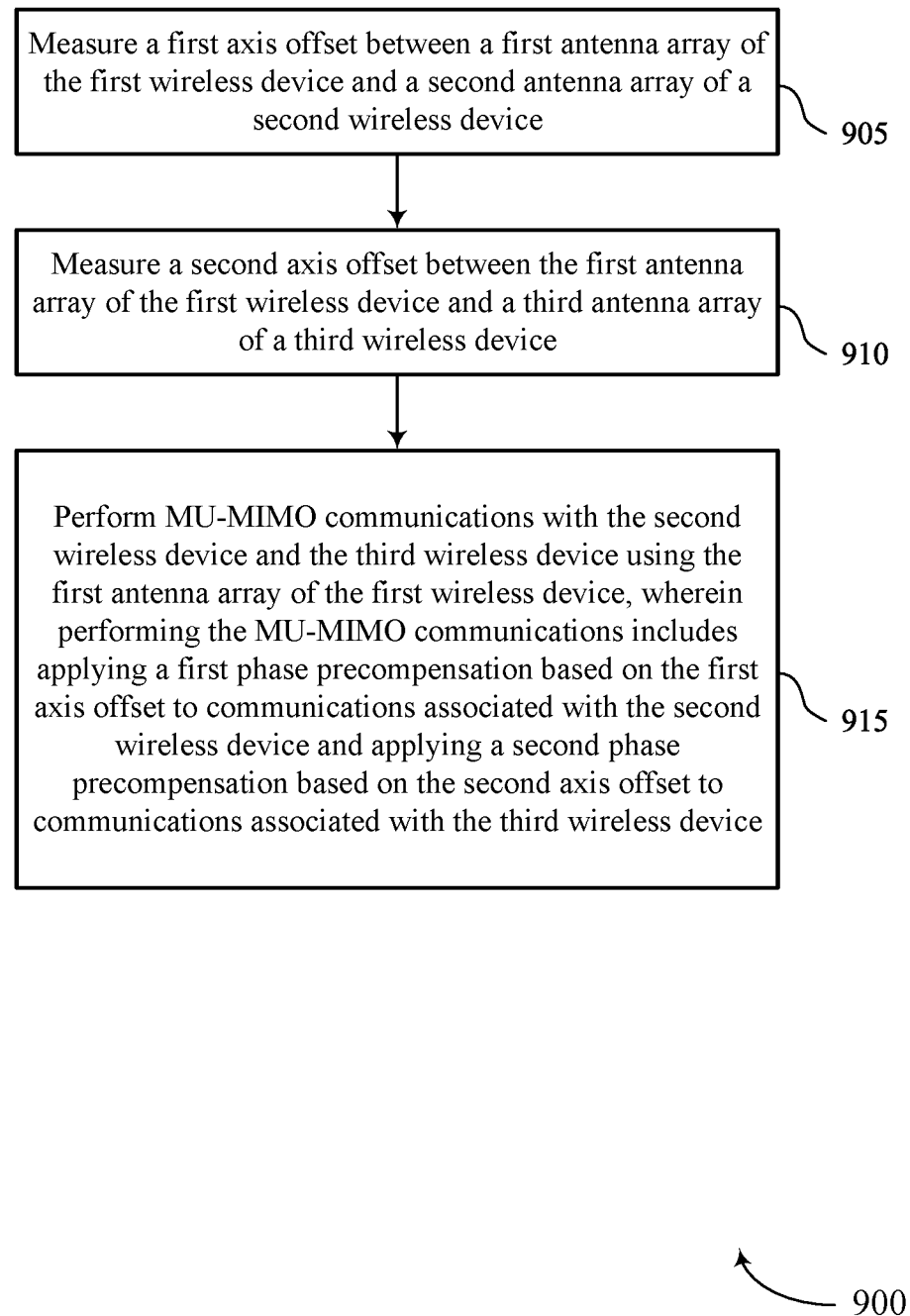
FIGS. 9 through 12 show flowcharts illustrating methods that support phase precompensation for MU-MIMO antenna mis-alignment in accordance with one or more aspects of the present disclosure.

FIG. 9 shows a flowchart illustrating a method 900 that supports phase precompensation for MU-MIMO antenna mis-alignment in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include measuring a first axis offset between a first antenna array of the first wireless device and a second antenna array of a second wireless device. The operations of 905 may be performed in accordance with examples as disclosed herein. In some examples, aspects of the operations of 905 may be performed by an axis offset component 725 as described with reference to FIG. 7.

At 910, the method may include measuring a second axis offset between the first antenna array of the first wireless device and a third antenna array of a third wireless device. The operations of 910 may be performed in accordance with examples as disclosed herein. In some examples, aspects of the operations of 910 may be performed by an axis offset component 725 as described with reference to FIG. 7.

At 915, the method may include performing multiple user-multiple input multiple output (MU-MIMO) communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device. The operations of 915 may be performed in accordance with examples as disclosed herein. In some examples, aspects of the operations of 915 may be performed by a phase precompensation component 730 as described with reference to FIG. 7.

Figure 10:
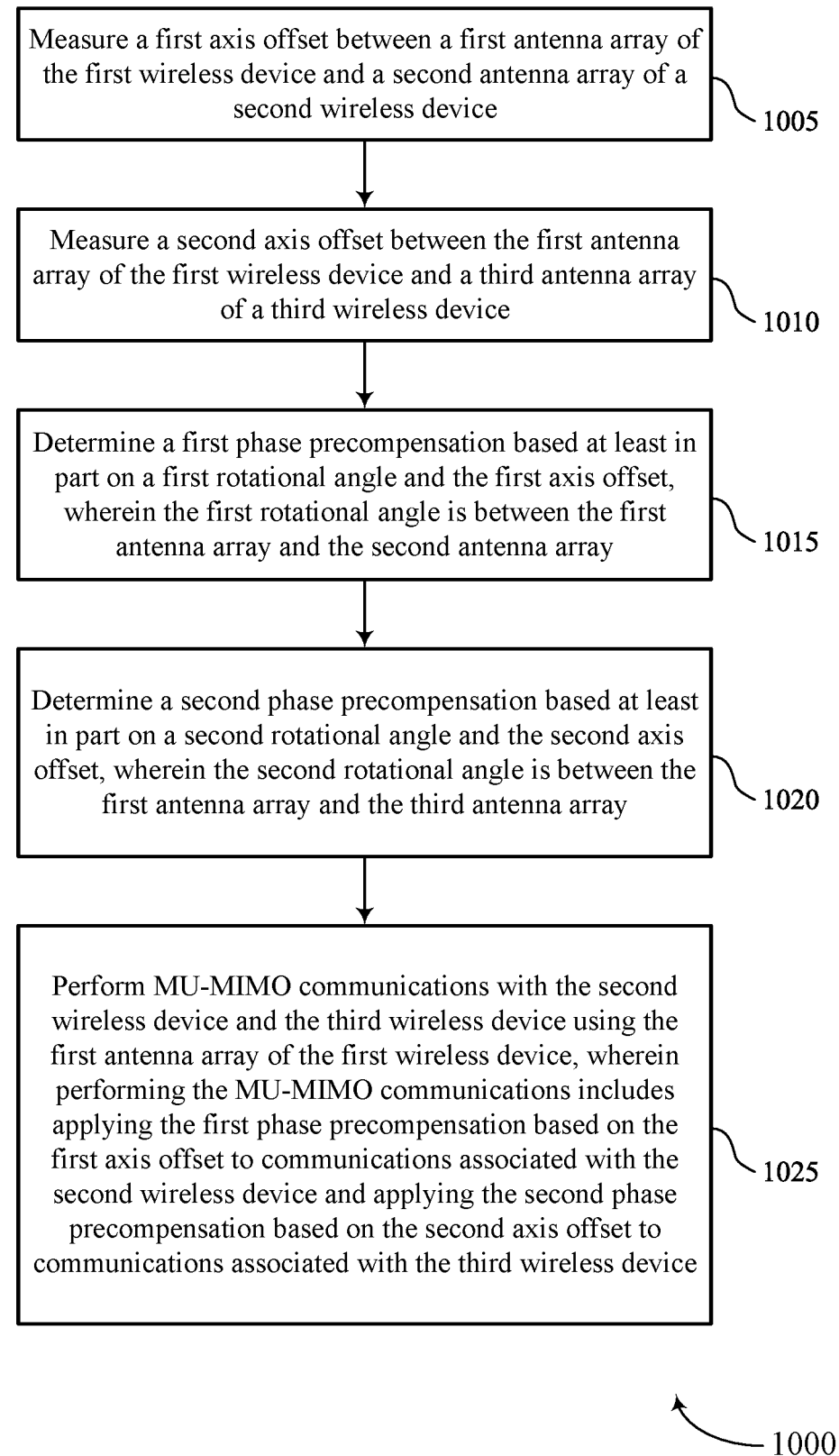

FIG. 10 shows a flowchart illustrating a method 1000 that supports phase precompensation for MU-MIMO antenna mis-alignment in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include measuring a first axis offset between a first antenna array of the first wireless device and a second antenna array of a second wireless device. The operations of 1005 may be performed in accordance with examples as disclosed herein. In some examples, aspects of the operations of 1005 may be performed by an axis offset component 725 as described with reference to FIG. 7.

At 1010, the method may include measuring a second axis offset between the first antenna array of the first wireless device and a third antenna array of a third wireless device. The operations of 1010 may be performed in accordance with examples as disclosed herein. In some examples, aspects of the operations of 1010 may be performed by an axis offset component 725 as described with reference to FIG. 7.

At 1015, the method may include determining a first phase precompensation based on a first rotational angle and the first axis offset, where the first rotational angle is between the first antenna array and the second antenna array. The operations of 1015 may be performed in accordance with examples as disclosed herein. In some examples, aspects of the operations of 1015 may be performed by a phase precompensation component 730 as described with reference to FIG. 7.

At 1020, the method may include determining a second phase precompensation based on a second rotational angle and the second axis offset, where the second rotational angle is between the first antenna array and the third antenna array. The operations of 1020 may be performed in accordance with examples as disclosed herein. In some examples, aspects of the operations of 1020 may be performed by a phase precompensation component 730 as described with reference to FIG. 7.

At 1025, the method may include performing MU-MIMO communications with the second wireless device and the third wireless device using the first antenna array of the first wireless device, where performing the MU-MIMO communications includes applying the first phase precompensation based on the first axis offset to communications associated with the second wireless device and applying the second phase precompensation based on the second axis offset to communications associated with the third wireless device. The operations of 1025 may be performed in accordance with examples as disclosed herein. In some examples, aspects of the operations of 1025 may be performed by a phase precompensation component 730 as described with reference to FIG. 7.

Figure 11:
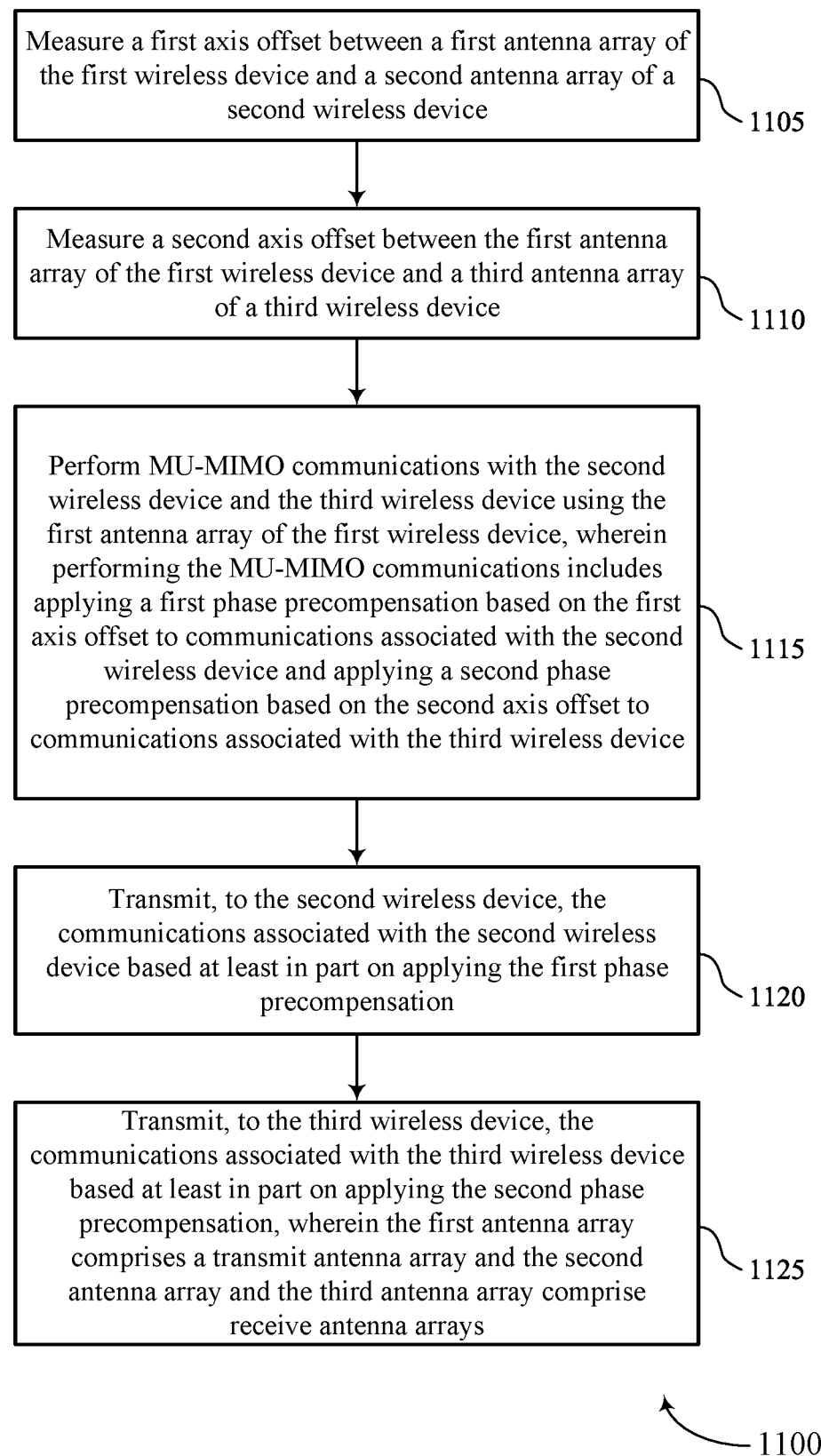

FIG. 11 shows a flowchart illustrating a method 1100 that supports phase precompensation for MU-MIMO antenna mis-alignment in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include measuring a first axis offset between a first antenna array of the first wireless device and a second antenna array of a second wireless device. The operations of 1105 may be performed in accordance with examples as disclosed herein. In some examples, aspects of the operations of 1105 may be performed by an axis offset component 725 as described with reference to FIG. 7.

At 1110, the method may include measuring a second axis offset between the first antenna array of the first wireless device and a third antenna array of a third wireless device. The operations of 1110 may be performed in accordance with examples as disclosed herein. In some examples, aspects of the operations of 1110 may be performed by an axis offset component 725 as described with reference to FIG. 7.

At 1115, the method may include performing multiple user-multiple input multiple output (MU-MIMO) communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device. The operations of 1115 may be performed in accordance with examples as disclosed herein. In some examples, aspects of the operations of 1115 may be performed by a phase precompensation component 730 as described with reference to FIG. 7.

At 1120, the method may include transmitting, to the second wireless device, the communications associated with the second wireless device based on applying the first phase precompensation. The operations of 1120 may be performed in accordance with examples as disclosed herein. In some examples, aspects of the operations of 1120 may be performed by a phase precompensation component 730 as described with reference to FIG. 7.

At 1125, the method may include transmitting, to the third wireless device, the communications associated with the third wireless device based on applying the second phase precompensation, where the first antenna array includes a transmit antenna array and the second antenna array and the third antenna array include receive antenna arrays. The operations of 1125 may be performed in accordance with examples as disclosed herein. In some examples, aspects of the operations of 1125 may be performed by a phase precompensation component 730 as described with reference to FIG. 7.

Figure 12:
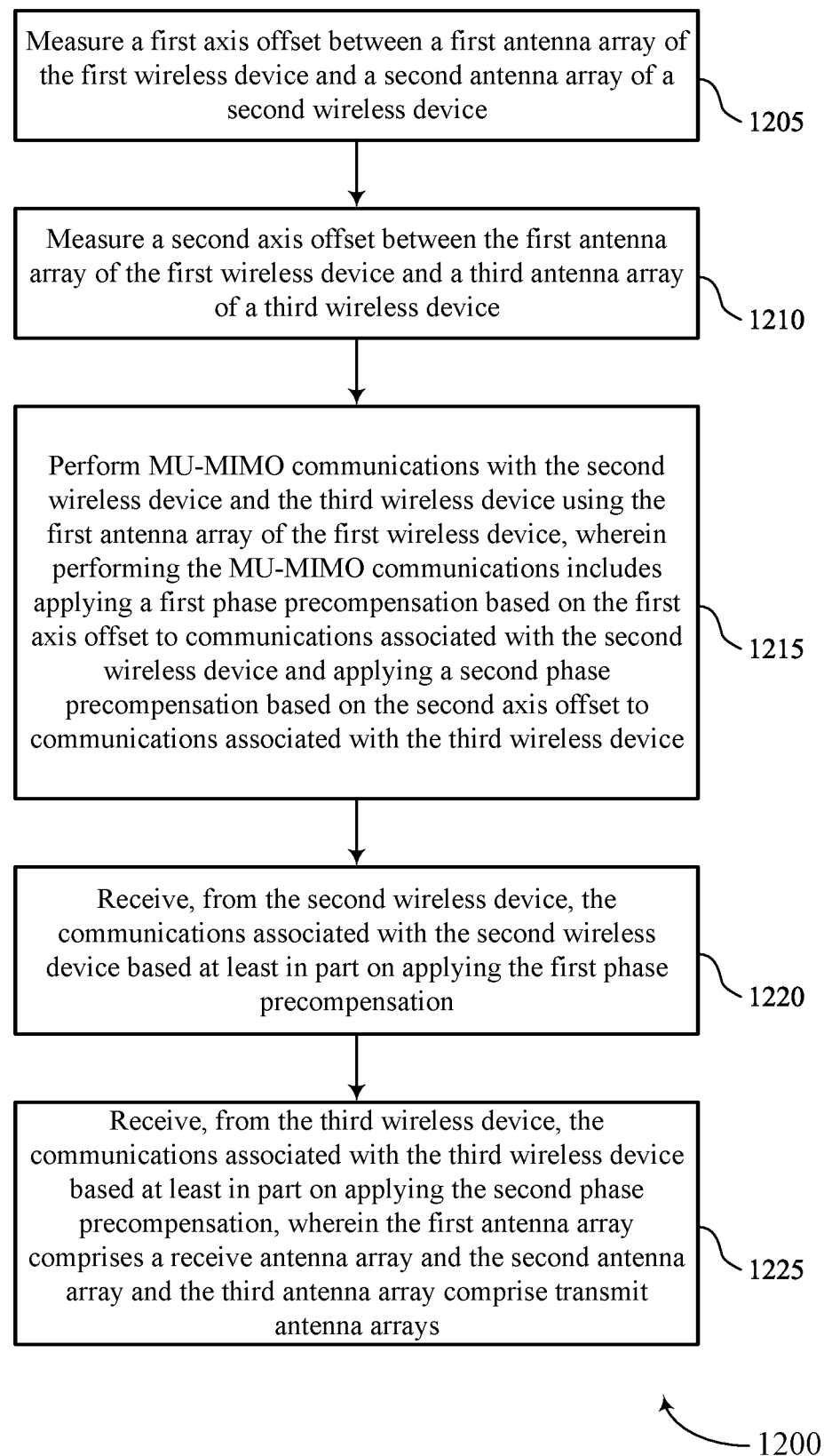

FIG. 12 shows a flowchart illustrating a method 1200 that supports phase precompensation for MU-MIMO antenna mis-alignment in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include measuring a first axis offset between a first antenna array of the first wireless device and a second antenna array of a second wireless device. The operations of 1205 may be performed in accordance with examples as disclosed herein. In some examples, aspects of the operations of 1205 may be performed by an axis offset component 725 as described with reference to FIG. 7.

At 1210, the method may include measuring a second axis offset between the first antenna array of the first wireless device and a third antenna array of a third wireless device. The operations of 1210 may be performed in accordance with examples as disclosed herein. In some examples, aspects of the operations of 1210 may be performed by an axis offset component 725 as described with reference to FIG. 7.

At 1215, the method may include performing multiple user-multiple input multiple output (MU-MIMO) communications with the second wireless device and the third wireless device using the first antenna array of the first wireless device, where performing the MU-MIMO communications includes applying a first phase precompensation based on the first axis offset to communications associated with the second wireless device and applying a second phase precompensation based on the second axis offset to communications associated with the third wireless device. The operations of 1215 may be performed in accordance with examples as disclosed herein. In some examples, aspects of the operations of 1215 may be performed by a phase precompensation component 730 as described with reference to FIG. 7.

At 1220, the method may include receiving, from the second wireless device, the communications associated with the second wireless device based on applying the first phase precompensation. The operations of 1220 may be performed in accordance with examples as disclosed herein. In some examples, aspects of the operations of 1220 may be performed by a phase precompensation component 730 as described with reference to FIG. 7.

At 1225, the method may include receiving, from the third wireless device, the communications associated with the third wireless device based on applying the second phase precompensation, where the first antenna array includes a receive antenna array and the second antenna array and the third antenna array include transmit antenna arrays. The operations of 1225 may be performed in accordance with examples as disclosed herein. In some examples, aspects of the operations of 1225 may be performed by a phase precompensation component 730 as described with reference to FIG. 7.

The following provides an overview of aspects of the present disclosure:

Aspect 1: A method of wireless communication at a wireless device, comprising: measuring a first axis offset between a first antenna array of the first wireless device and a second antenna array of a second wireless device; measuring a second axis offset between the first antenna array of the first wireless device and a third antenna array of a third wireless device; performing multiple user-multiple input multiple output (MU-MIMO) communications with the second wireless device and the third wireless device using the first antenna array of the first wireless device, wherein performing the MU-MIMO communications includes applying a first phase precompensation based on the first axis offset to communications associated with the second wireless device and applying a second phase precompensation based on the second axis offset to communications associated with the third wireless device.

Aspect 2: The method of aspect 1, further comprising: determining the first phase precompensation based at least in part on a first rotational angle and the first axis offset, wherein the first rotational angle is between the first antenna array and the second antenna array; and determining the second phase precompensation based at least in part on a second rotational angle and the second axis offset, wherein the second rotational angle is between the first antenna array and the third antenna array.

Aspect 3: The method of aspect 2, further comprising: estimating the first rotational angle based at least in part on one or more first phase measurements; and estimating the second rotational angle based at least in part on one or more second phase measurements.

Aspect 4: The method of any of aspects 2 through 3, further comprising: estimating the first rotational angle according to a first coordinate plane between the first antenna array and the second antenna array; and estimating the second rotational angle according to a second coordinate plane between the first antenna array and the third antenna array.

Aspect 5: The method of any of aspects 1 through 4, wherein performing the MU-MIMO communications comprises: transmitting, to the second wireless device, the communications associated with the second wireless device based at least in part on applying the first phase precompensation; and transmitting, to the third wireless device, the communications associated with the third wireless device based at least in part on applying the second phase precompensation, wherein the first antenna array comprises a transmit antenna array and the second antenna array and the third antenna array comprise receive antenna arrays.

Aspect 6: The method of any of aspects 1 through 4, wherein performing the MU-MIMO communications comprises: receiving, from the second wireless device, the communications associated with the second wireless device based at least in part on applying the first phase precompensation; and receiving, from the third wireless device, the communications associated with the third wireless device based at least in part on applying the second phase precompensation, wherein the first antenna array comprises a receive antenna array and the second antenna array and the third antenna array comprise transmit antenna arrays.

Aspect 7: The method of any of aspects 1 through 6, further comprising: performing one or more first phase measurements on a first reference signal from the second wireless device via the second antenna array, wherein the first axis offset is obtained from a coordinate rotation of the one or more first phase measurements; performing one or more second phase measurements on a second reference signal from the third wireless device via the third antenna array, wherein the second axis offset is obtained from a coordinate rotation of the one or more second phase measurements.

Aspect 8: The method of any of aspects 1 through 7, wherein measuring the first axis offset is based at least in part on determining the first antenna array and the second antenna array are symmetric; and measuring the second axis offset is based at least in part on determining the first antenna array and the third antenna array are symmetric.

Aspect 9: The method of any of aspects 1 through 8, wherein measuring the first axis offset is based at least in part on comparing one or more first distances between the first wireless device and the second wireless device according to one or more first phase measurements; and measuring the second axis offset is based at least in part on comparing one or more second distances between the first wireless device and the third wireless device according to one or more second phase measurements.

Aspect 10: The method of aspect 9, further comprising: comparing the one or more first distances during a first threshold time associated with the one or more first phase measurements; and comparing the one or more second distances during a second threshold time associated with the one or more second phase measurements.

Aspect 11: The method of any of aspects 9 through 10, further comprising: comparing the one or more first distances and the one or more second distances during a same duration based at least in part on a threshold distance between the second wireless device and the third wireless device being satisfied.

Aspect 12: An apparatus comprising a processor; memory coupled with the processor; and instructions stored in the memory and executable by the processor to cause the apparatus to perform a method of any of aspects 1 through 11.

Aspect 13: An apparatus comprising at least one means for performing a method of any of aspects 1 through 11.

Aspect 14: A non-transitory computer-readable medium storing code the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a first wireless device, comprising:
    measuring a first axis offset between a first antenna array of the first wireless device and a second antenna array of a second wireless device;
    measuring a second axis offset between the first antenna array of the first wireless device and a third antenna array of a third wireless device; and
    performing multiple user-multiple input multiple output (MU-MIMO) communications with the second wireless device and the third wireless device using the first antenna array of the first wireless device, wherein performing the MU-MIMO communications includes applying a first phase precompensation based on the first axis offset to communications associated with the second wireless device and applying a second phase precompensation based on the second axis offset to communications associated with the third wireless device.

2. The method of claim 1, further comprising:
    determining the first phase precompensation based at least in part on a first rotational angle and the first axis offset, wherein the first rotational angle is between the first antenna array and the second antenna array; and
    determining the second phase precompensation based at least in part on a second rotational angle and the second axis offset, wherein the second rotational angle is between the first antenna array and the third antenna array.

3. The method of claim 2, further comprising:
    estimating the first rotational angle based at least in part on one or more first phase measurements; and
    estimating the second rotational angle based at least in part on one or more second phase measurements.

4. The method of claim 2, further comprising:
    estimating the first rotational angle according to a first coordinate plane between the first antenna array and the second antenna array; and
    estimating the second rotational angle according to a second coordinate plane between the first antenna array and the third antenna array.

5. The method of claim 1, wherein performing the MU-MIMO communications comprises:
    transmitting, to the second wireless device, the communications associated with the second wireless device based at least in part on applying the first phase precompensation; and
    transmitting, to the third wireless device, the communications associated with the third wireless device based at least in part on applying the second phase precompensation, wherein the first antenna array comprises a transmit antenna array and the second antenna array and the third antenna array comprise receive antenna arrays.

6. The method of claim 1, wherein performing the MU-MIMO communications comprises:
    receiving, from the second wireless device, the communications associated with the second wireless device based at least in part on applying the first phase precompensation; and
    receiving, from the third wireless device, the communications associated with the third wireless device based at least in part on applying the second phase precompensation, wherein the first antenna array comprises a receive antenna array and the second antenna array and the third antenna array comprise transmit antenna arrays.

7. The method of claim 1, further comprising:
    performing one or more first phase measurements on a first reference signal from the second wireless device via the second antenna array, wherein the first axis offset is obtained from a coordinate rotation of the one or more first phase measurements; and
    performing one or more second phase measurements on a second reference signal from the third wireless device via the third antenna array, wherein the second axis offset is obtained from a coordinate rotation of the one or more second phase measurements.

8. The method of claim 1, wherein:
measuring the first axis offset is based at least in part on determining the first antenna array and the second antenna array are symmetric; and
measuring the second axis offset is based at least in part on determining the first antenna array and the third antenna array are symmetric.

9. The method of claim 1, wherein:
measuring the first axis offset is based at least in part on comparing one or more first distances between the first wireless device and the second wireless device according to one or more first phase measurements; and
measuring the second axis offset is based at least in part on comparing one or more second distances between the first wireless device and the third wireless device according to one or more second phase measurements.

10. The method of claim 9, further comprising:
comparing the one or more first distances during a first threshold time associated with the one or more first phase measurements; and
comparing the one or more second distances during a second threshold time associated with the one or more second phase measurements.

11. The method of claim 9, further comprising:
comparing the one or more first distances and the one or more second distances during a same duration based at least in part on a threshold distance between the second wireless device and the third wireless device being satisfied.

12. An apparatus, comprising:
a processor;
memory coupled with the processor; and
instructions stored in the memory and executable by the processor to cause the apparatus to:
measure a first axis offset between a first antenna array of a first wireless device and a second antenna array of a second wireless device;
measure a second axis offset between the first antenna array of the first wireless device and a third antenna array of a third wireless device; and
perform multiple user-multiple input multiple output (MU-MIMO) communications with the second wireless device and the third wireless device using the first antenna array of the first wireless device, wherein performing the MU-MIMO communications includes applying a first phase precompensation based on the first axis offset to communications associated with the second wireless device and applying a second phase precompensation based on the second axis offset to communications associated with the third wireless device.

13. The apparatus of claim 12, wherein the instructions are further executable by the processor to cause the apparatus to:
determine the first phase precompensation based at least in part on a first rotational angle and the first axis offset, wherein the first rotational angle is between the first antenna array and the second antenna array; and
determine the second phase precompensation based at least in part on a second rotational angle and the second axis offset, wherein the second rotational angle is between the first antenna array and the third antenna array.

14. The apparatus of claim 13, wherein the instructions are further executable by the processor to cause the apparatus to:
estimate the first rotational angle based at least in part on one or more first phase measurements; and
estimate the second rotational angle based at least in part on one or more second phase measurements.

15. The apparatus of claim 13, wherein the instructions are further executable by the processor to cause the apparatus to:
estimate the first rotational angle according to a first coordinate plane between the first antenna array and the second antenna array; and
estimate the second rotational angle according to a second coordinate plane between the first antenna array and the third antenna array.

16. The apparatus of claim 12, wherein the instructions to perform the MU-MIMO communications are executable by the processor to cause the apparatus to:
transmit, to the second wireless device, the communications associated with the second wireless device based at least in part on applying the first phase precompensation; and
transmit, to the third wireless device, the communications associated with the third wireless device based at least in part on applying the second phase precompensation, wherein the first antenna array comprises a transmit antenna array and the second antenna array and the third antenna array comprise receive antenna arrays.

17. The apparatus of claim 12, wherein the instructions to perform the MU-MIMO communications are executable by the processor to cause the apparatus to:
receive, from the second wireless device, the communications associated with the second wireless device based at least in part on applying the first phase precompensation; and
receive, from the third wireless device, the communications associated with the third wireless device based at least in part on applying the second phase precompensation, wherein the first antenna array comprises a receive antenna array and the second antenna array and the third antenna array comprise transmit antenna arrays.

18. The apparatus of claim 12, wherein the instructions are further executable by the processor to cause the apparatus to:
perform one or more first phase measurements on a first reference signal from the second wireless device via the second antenna array, wherein the first axis offset is obtained from a coordinate rotation of the one or more first phase measurements; and
perform one or more second phase measurements on a second reference signal from the third wireless device via the third antenna array, wherein the second axis offset is obtained from a coordinate rotation of the one or more second phase measurements.

19. The apparatus of claim 12, wherein:
measuring the first axis offset is based at least in part on determining the first antenna array and the second antenna array are symmetric; and
measuring the second axis offset is based at least in part on determining the first antenna array and the third antenna array are symmetric.

20. The apparatus of claim 12, wherein:
measuring the first axis offset is based at least in part on comparing one or more first distances between the first wireless device and the second wireless device according to one or more first phase measurements; and measuring the second axis offset is based at least in part on comparing one or more second distances between the first wireless device and the third wireless device according to one or more second phase measurements.

21. The apparatus of claim 20, wherein the instructions are further executable by the processor to cause the apparatus to:

compare the one or more first distances during a first threshold time associated with the one or more first phase measurements; and compare the one or more second distances during a second threshold time associated with the one or more second phase measurements.

22. The apparatus of claim 20, wherein the instructions are further executable by the processor to cause the apparatus to:

compare the one or more first distances and the one or more second distances during a same duration based at least in part on a threshold distance between the second wireless device and the third wireless device being satisfied.

23. An apparatus, comprising:

means for measuring a first axis offset between a first antenna array of a first wireless device and a second antenna array of a second wireless device;

means for measuring a second axis offset between the first antenna array of the first wireless device and a third antenna array of a third wireless device; and means for performing multiple user-multiple input multiple output (MU-MIMO) communications with the second wireless device and the third wireless device using the first antenna array of the first wireless device, wherein performing the MU-MIMO communications includes applying a first phase precompensation based on the first axis offset to communications associated with the second wireless device and applying a second phase precompensation based on the second axis offset to communications associated with the third wireless device.

24. The apparatus of claim 23, further comprising:

means for determining the first phase precompensation based at least in part on a first rotational angle and the first axis offset, wherein the first rotational angle is between the first antenna array and the second antenna array; and means for determining the second phase precompensation based at least in part on a second rotational angle and the second axis offset, wherein the second rotational angle is between the first antenna array and the third antenna array.

25. The apparatus of claim 24, further comprising:

means for estimating the first rotational angle based at least in part on one or more first phase measurements; and means for estimating the second rotational angle based at least in part on one or more second phase measurements.

26. The apparatus of claim 24, further comprising:

means for estimating the first rotational angle according to a first coordinate plane between the first antenna array and the second antenna array; and means for estimating the second rotational angle according to a second coordinate plane between the first antenna array and the third antenna array.

27. The apparatus of claim 23, wherein the means for performing the MU-MIMO communications comprises:

means for transmitting, to the second wireless device, the communications associated with the second wireless device based at least in part on applying the first phase precompensation; and means for transmitting, to the third wireless device, the communications associated with the third wireless device based at least in part on applying the second phase precompensation, wherein the first antenna array comprises a transmit antenna array and the second antenna array and the third antenna array comprise receive antenna arrays.

28. The apparatus of claim 23, wherein the means for performing the MU-MIMO communications comprises:

means for receiving, from the second wireless device, the communications associated with the second wireless device based at least in part on applying the first phase precompensation; and means for receiving, from the third wireless device, the communications associated with the third wireless device based at least in part on applying the second phase precompensation, wherein the first antenna array comprises a receive antenna array and the second antenna array and the third antenna array comprise transmit antenna arrays.

29. The apparatus of claim 23, further comprising:

means for performing one or more first phase measurements on a first reference signal from the second wireless device via the second antenna array, wherein the first axis offset is obtained from a coordinate rotation of the one or more first phase measurements; and means for performing one or more second phase measurements on a second reference signal from the third wireless device via the third antenna array, wherein the second axis offset is obtained from a coordinate rotation of the one or more second phase measurements.

30. A non-transitory computer-readable medium storing code, the code comprising instructions executable by a processor to:

measure a first axis offset between a first antenna array of a first wireless device and a second antenna array of a second wireless device;

measure a second axis offset between the first antenna array of the first wireless device and a third antenna array of a third wireless device; and perform multiple user-multiple input multiple output (MU-MIMO) communications with the second wireless device and the third wireless device using the first antenna array of the first wireless device, wherein performing the MU-MIMO communications includes applying a first phase precompensation based on the first axis offset to communications associated with the second wireless device and applying a second phase precompensation based on the second axis offset to communications associated with the third wireless device.

* * * * *